United States Patent
Yamakado et al.

(10) Patent No.: US 9,598,077 B2
(45) Date of Patent: Mar. 21, 2017

(54) VEHICLE MOVEMENT CONTROL SYSTEM

(71) Applicant: Hitachi Automotive Systems, Ltd., Hitachinaka-shi, Ibaraki (JP)

(72) Inventors: Makoto Yamakado, Tokyo (JP); Keiichiro Nagatsuka, Hitachinaka (JP); Mitsuhide Sasaki, Hitachinaka (JP); Mikio Ueyama, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 15/028,296

(22) PCT Filed: Oct. 3, 2014

(86) PCT No.: PCT/JP2014/076489
§ 371 (c)(1),
(2) Date: Apr. 8, 2016

(87) PCT Pub. No.: WO2015/053169
PCT Pub. Date: Apr. 16, 2015

(65) Prior Publication Data
US 2016/0264135 A1    Sep. 15, 2016

(30) Foreign Application Priority Data
Oct. 10, 2013  (JP) ................................ 2013-212434

(51) Int. Cl.
*B60W 30/09*    (2012.01)
*B60T 7/12*    (2006.01)
(Continued)

(52) U.S. Cl.
CPC ............... *B60W 30/09* (2013.01); *B60T 7/12* (2013.01); *B60T 7/22* (2013.01); *B60W 10/18* (2013.01);
(Continued)

(58) Field of Classification Search
CPC ...... B60W 30/09; B60W 30/02; B60W 10/18; B60W 10/20; B60W 2510/18;
(Continued)

(56) References Cited

U.S. PATENT DOCUMENTS

2007/0123383 A1    5/2007  Yokoyama et al.
2009/0192675 A1    7/2009  Yamakado et al.
(Continued)

FOREIGN PATENT DOCUMENTS

EP    1 992 537 A2    11/2008
EP    2 338 758 A1    6/2011
(Continued)

OTHER PUBLICATIONS

International Search Report (PCT/ISA/210) issued in PCT Application No. PCT/JP2014/076489 dated Jan. 13, 2015 with English translation (five pages).
(Continued)

*Primary Examiner* — Richard Camby
(74) *Attorney, Agent, or Firm* — Crowell & Moring LLP

(57) ABSTRACT

Provided is a vehicle movement control system which does not cause a discomfort feeling at a normal time and securely assists a driver at the time of emergency avoidance steering. The vehicle movement control system includes: a risk potential estimation unit which estimates a risk potential of a vehicle based on input environmental information and vehicle information; a vehicle longitudinal movement control unit which generates a longitudinal movement control command of the vehicle based on a lateral jerk of the vehicle and a predetermined gain; a vehicle yawing movement control unit which generates a yawing movement control command of the vehicle based on the lateral jerk of the vehicle and the predetermined gain; and a ratio adjustment unit which adjusts a ratio between the longitudinal move-
(Continued)

ment control command of the vehicle and the yawing movement control command of the vehicle, wherein the ratio adjustment unit adjusts the ratio based on the risk potential estimated by the risk potential estimation unit.

20 Claims, 20 Drawing Sheets

(51) Int. Cl.
- B60T 7/22 (2006.01)
- B60W 30/02 (2012.01)
- B62D 15/02 (2006.01)
- B60W 10/18 (2012.01)
- B60W 10/20 (2006.01)
- B60R 1/00 (2006.01)

(52) U.S. Cl.
CPC ............ *B60W 10/20* (2013.01); *B60W 30/02* (2013.01); *B62D 15/0265* (2013.01); *B60R 1/00* (2013.01); *B60T 2201/022* (2013.01); *B60W 2510/18* (2013.01); *B60W 2510/20* (2013.01); *B60W 2520/10* (2013.01); *B60W 2520/105* (2013.01); *B60W 2520/14* (2013.01); *B60W 2600/00* (2013.01); *B60Y 2300/09* (2013.01)

(58) Field of Classification Search
CPC ......... B60W 2510/20; B60W 2520/10; B60W 2520/105; B60W 2520/14; B60W 2600/00; B60T 2201/022; B60T 7/12; B60T 7/22; B62D 15/0265; B60R 1/00; B60Y 2300/09
See application file for complete search history.

(56) References Cited

U.S. PATENT DOCUMENTS

| | | |
|---|---|---|
| 2011/0231033 A1 | 9/2011 | Yamakado et al. |
| 2011/0276227 A1 | 11/2011 | Sugawara et al. |
| 2012/0101657 A1 | 4/2012 | Yamakado et al. |
| 2012/0323445 A1 | 12/2012 | Yamakado et al. |
| 2015/0239442 A1 | 8/2015 | Yamakado et al. |
| 2016/0059852 A1* | 3/2016 | Yamakado .......... B60W 40/107 701/41 |

FOREIGN PATENT DOCUMENTS

| | | |
|---|---|---|
| EP | 2 433 840 A1 | 3/2012 |
| EP | 2 626 264 A1 | 8/2013 |
| JP | 2005-67426 A | 3/2005 |
| JP | 2005-132172 A | 5/2005 |
| JP | 2007-139011 A | 6/2007 |
| JP | 2008-285066 A | 11/2008 |
| JP | 2009-262701 A | 11/2009 |
| JP | 2010-89701 A | 4/2010 |
| JP | 2010-162911 A | 7/2010 |
| JP | 2014-69766 A | 4/2014 |

OTHER PUBLICATIONS

Japanese-language Written Opinion (PCT/ISA/237) issued in PCT Application No. PCT/JP2014/076489 dated Jan. 13, 2015 (six pages).

* cited by examiner

FIG. 1
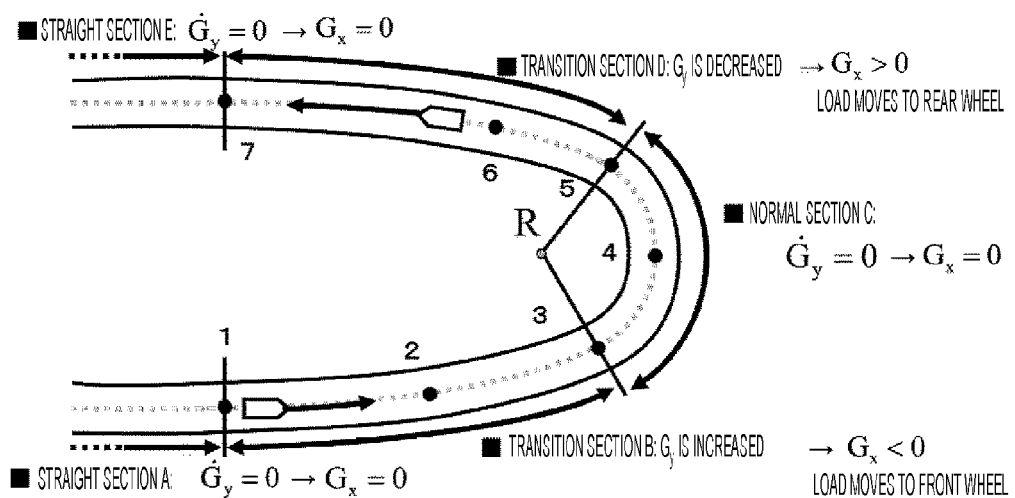
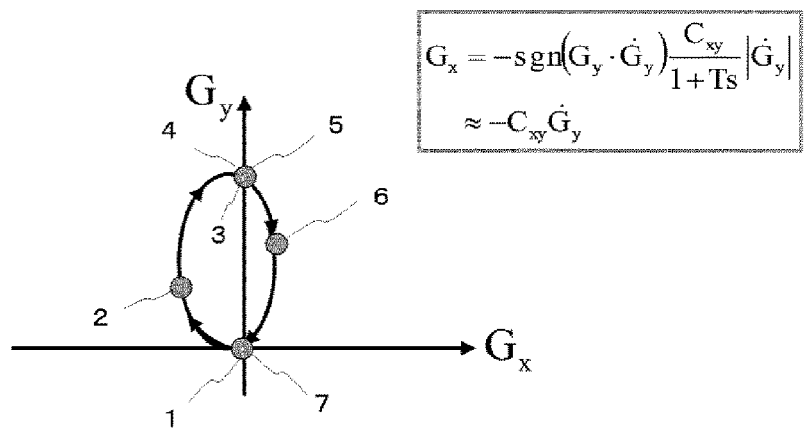

FIG. 3
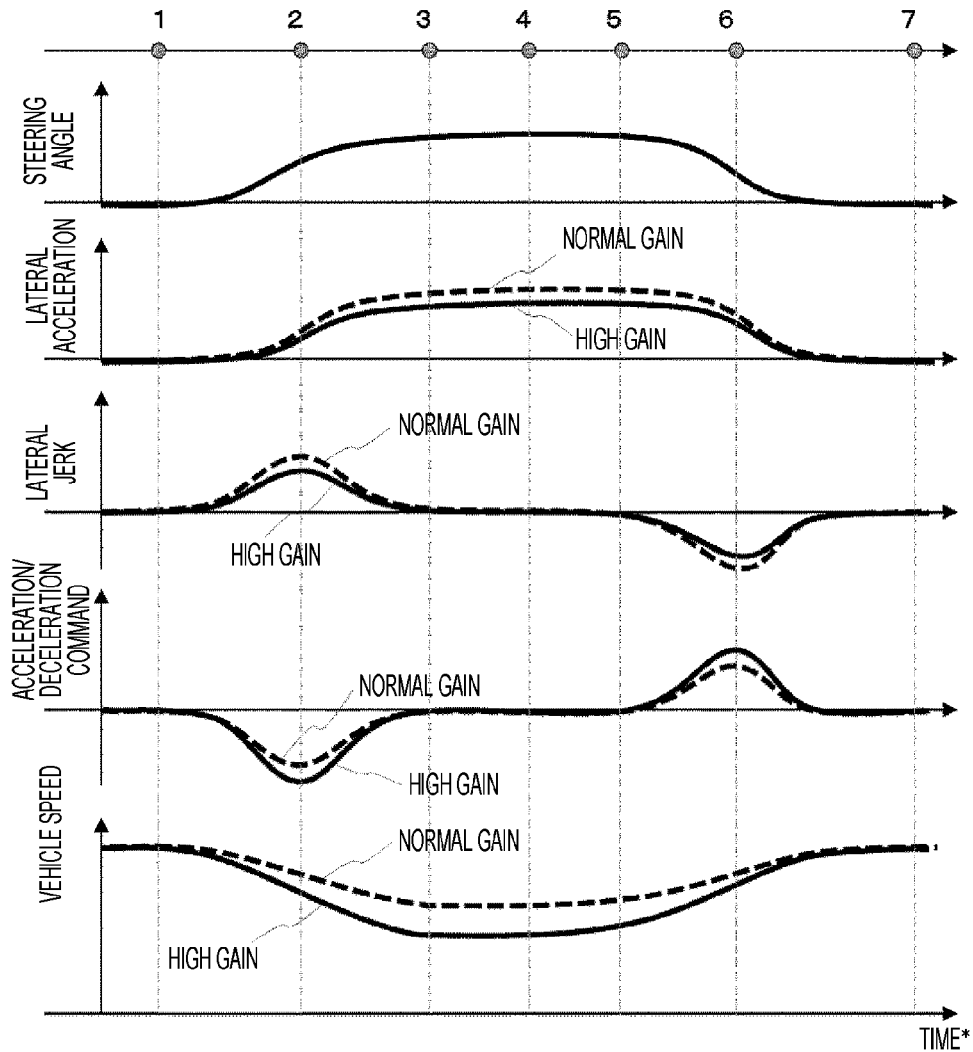
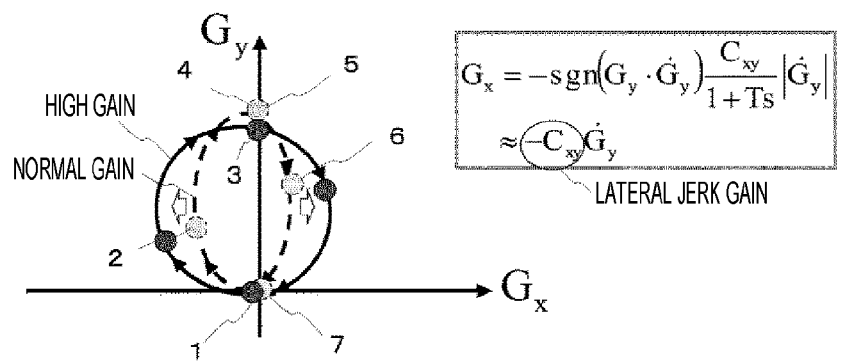

FIG. 4
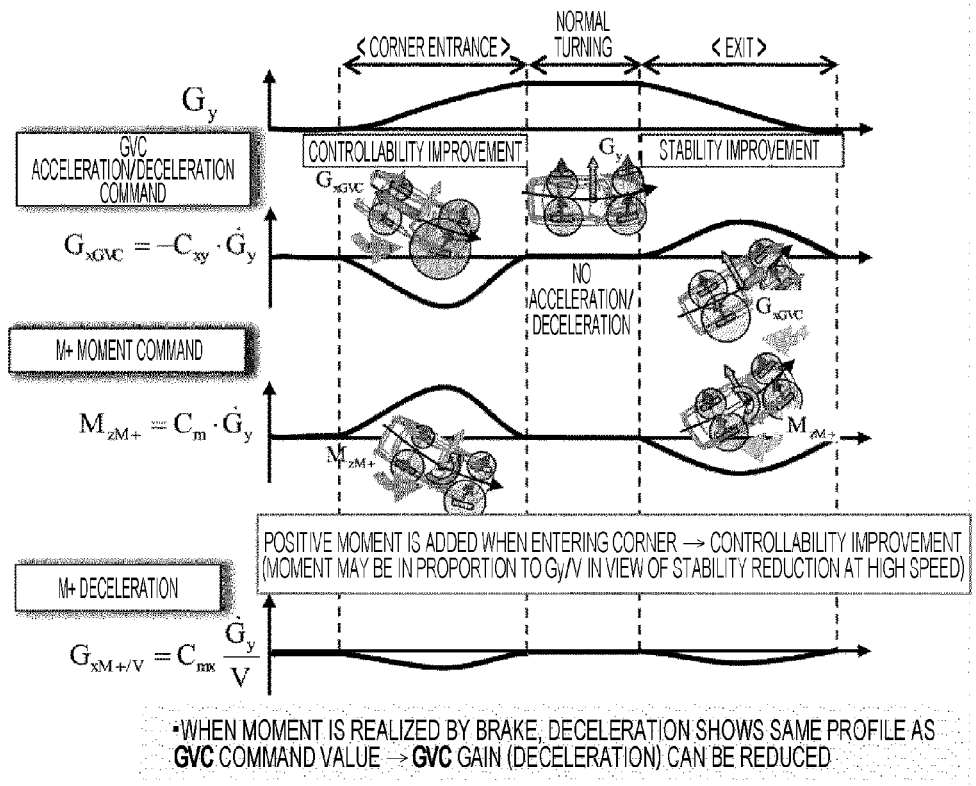
FIG. 5A
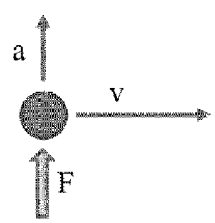
FIG. 5B
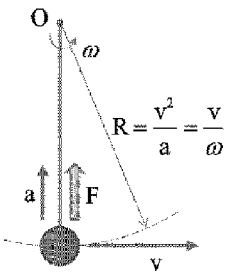
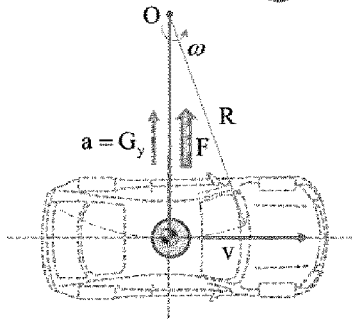
FIG. 5C

FIG. 6
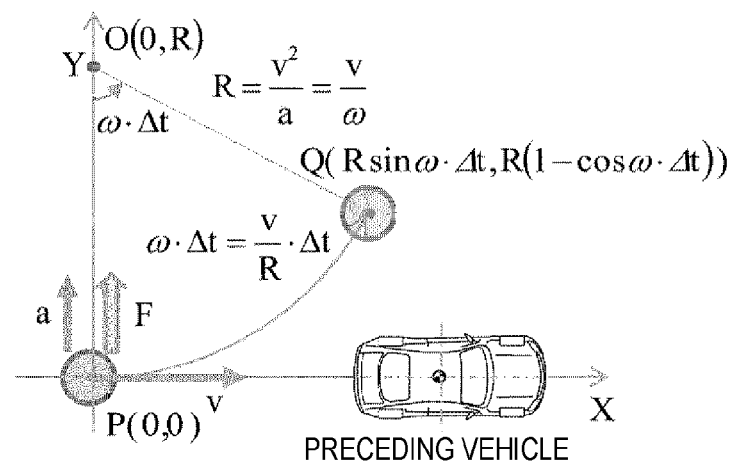
PRECEDING VEHICLE
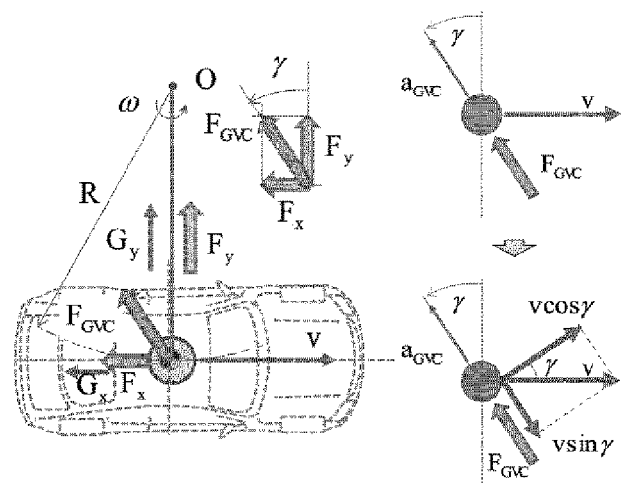
FIG. 7A   FIG. 7B

| SIMULATION CONDITIONS | | | |
|---|---|---|---|
| ROAD SURFACE | DRY (FRICTION COEFFICIENT 1.0) | INITIAL SPEED | 80km/h |
| TIRE MODEL | MAGIC FORMULA | DRIVER MODEL | SECONDARY PREDICTION FORWARD WATCHING MODEL |
| (i) | Without | NO BRAKE CONTROL (ONLY STEER) | |
| (ii) | GVC | FOUR-WHEEL BRAKE CONTROL OF GVC | |
| (iii) | Moment+ | APPLY BRAKE FORCE ONLY TO REAR INSIDE WHEEL | |

FIG. 12A    FIG. 12B
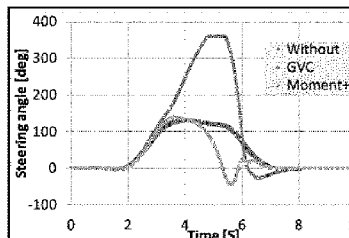
STEERING ANGLE
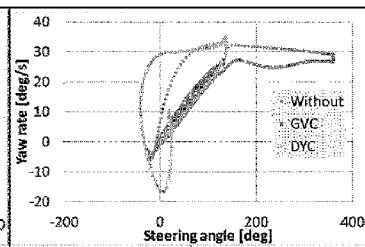
STEERING ANGLE vs YAW RATE
FIG. 12C    FIG. 12D
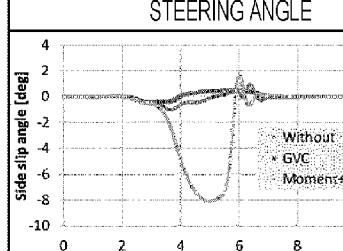
LATERAL SLIDE ANGLE
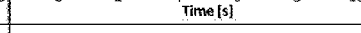
VEHICLE SPEED
FIG. 12E    FIG. 12F
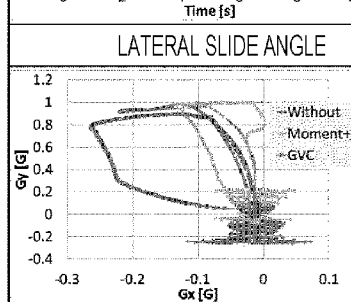
"g-g" DIAGRAM
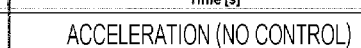
ACCELERATION (NO CONTROL)
FIG. 12G    FIG. 12H
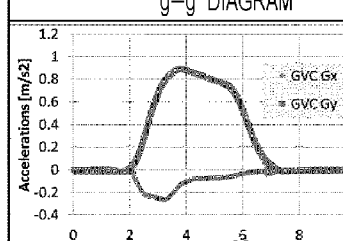
ACCELERATION (GVC)
ACCELERATION (Moment+)

FIG. 15
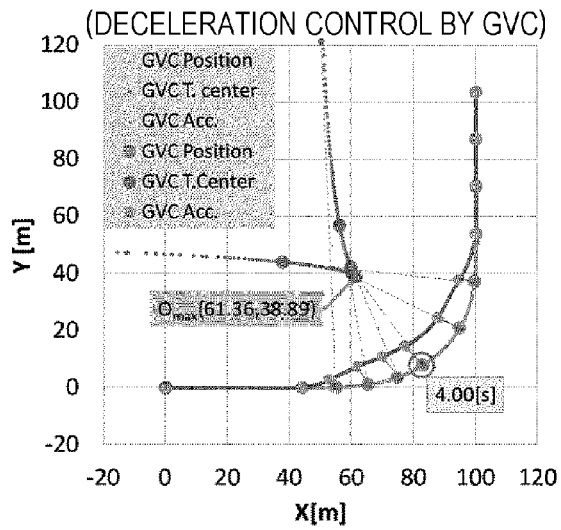
FIG. 16
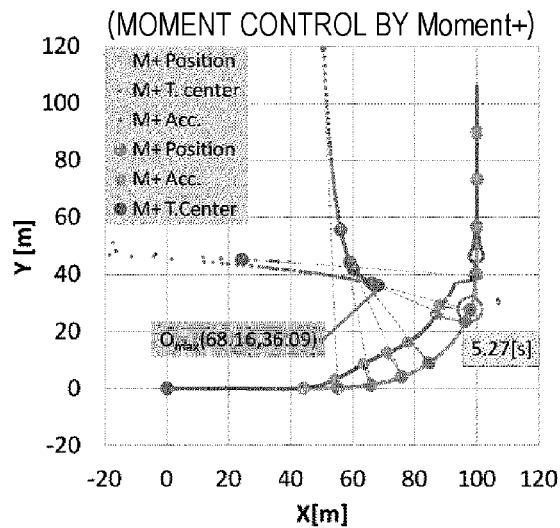
FIG. 17
| CASE | TIME TAKEN FOR CONVERGENCE OF TURNING CENTER [s] | POSITION OF TURNING CENTER | DIFFERENCE |
|---|---|---|---|
| (i)Without | 5.92 | (73.72, 38.06) | (13.72,−1.94) |
| (ii)GVC | 4.00 | (61.36,38.39) | (1.63,−1.61) |
| (iii)Moment+ | 5.27 | (68.16,36.09) | (8.16,−3.91) |

FIG. 22
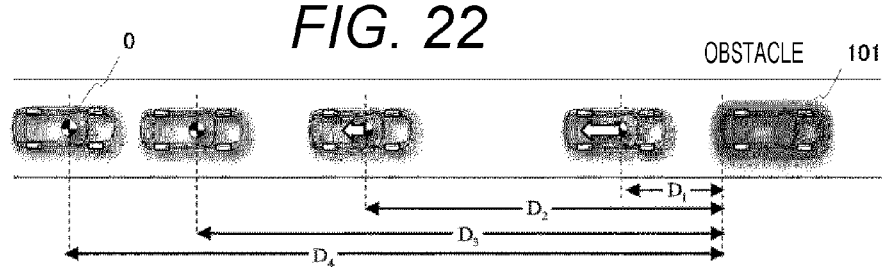
FIG. 23
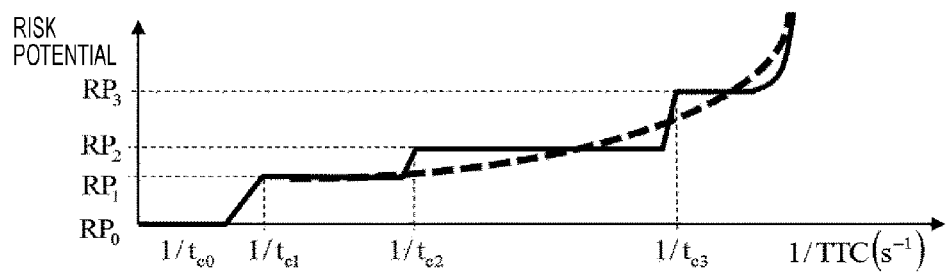
FIG. 24
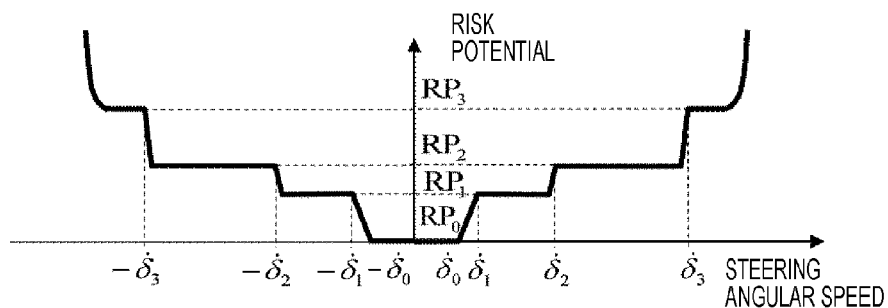
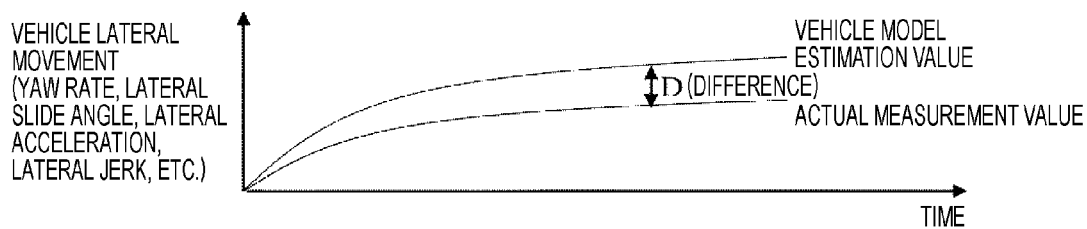
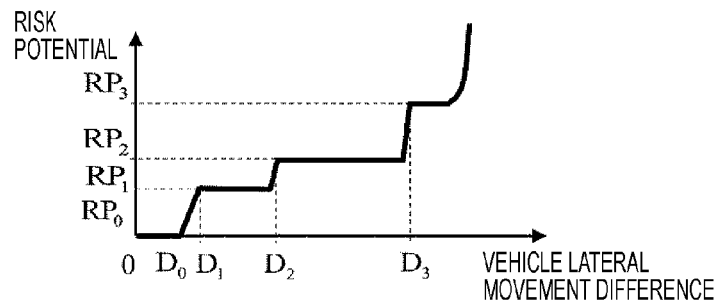

FIG. 25

| | RISK POTENTIAL |
|---|---|
| RP0 | NO RISK |
| RP1 | POSSIBILITY OF COLLISION |
| RP2 | HIGH POSSIBILITY OF COLLISION |
| RP3 | EXTREMELY HIGH POSSIBILITY OF COLLISION |

FIG. 26

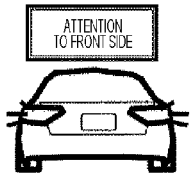

| | STRENGTH OF AUTOMATIC BRAKE | RATIO OF DECELERATION CONTROL AND MOMENT CONTROL | DISPLAYING OF MULTI-INFORMATION DISPLAY | BUZZER | VIBRATION (STEER REACTION FORCE, PEDAL REACTION FORCE, ETC.) |
|---|---|---|---|---|---|
| RP0 NO RISK | NO BRAKE CONTROL | $R_{GM}$ =0.25 (OR 0) | NO DISPLAYING | NO BUZZER | NO VIBRATION |
| RP1 WARNING ON INTER-VEHICLE DISTANCE | NO BRAKE CONTROL | $R_{GM}$=0.40 | ATTENTION TO FRONT SIDE | BEEP, BEEP, BEEP... | WEAK VIBRATION |
| RP2 PRIMARY BRAKE AND WARNING | SMALL | $R_{GM}$=0.60 | | BEEP, BEEP, BEEP... | WEAK VIBRATION |
| RP3 SECONDARY BRAKE AND WARNING | LARGE | $R_{GM}$=0.80 (OR 1.0) | | BEEP--... | STRONG VIBRATION |

FIG. 28
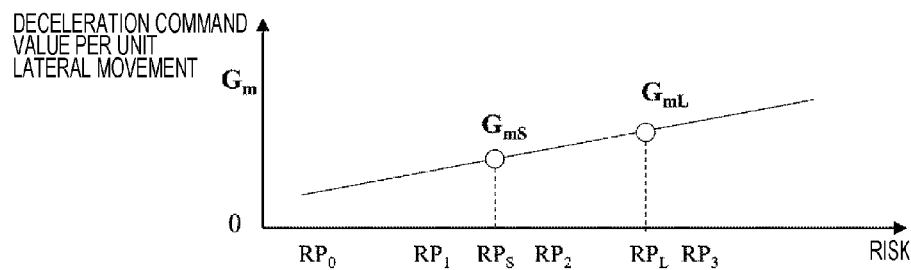
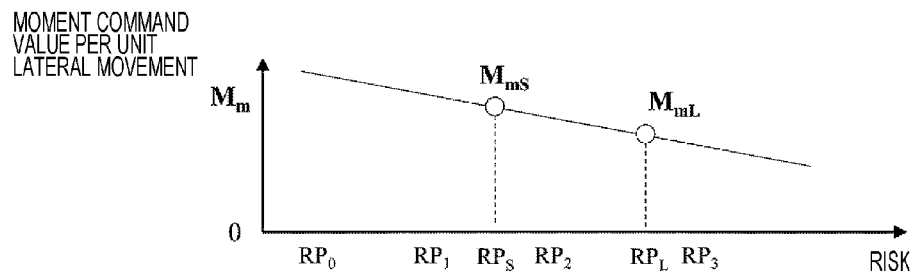
FIG. 29
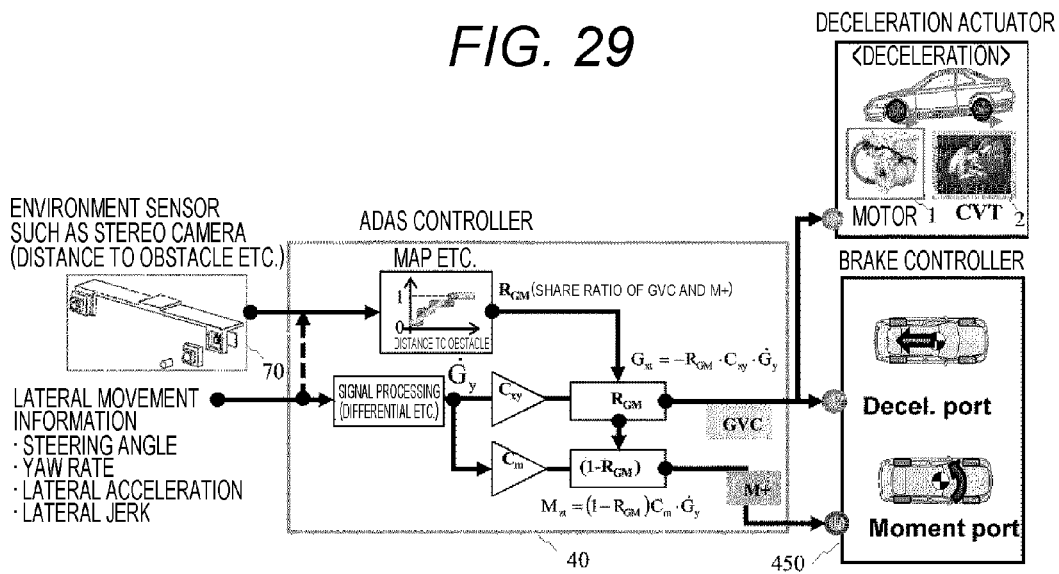

FIG. 33
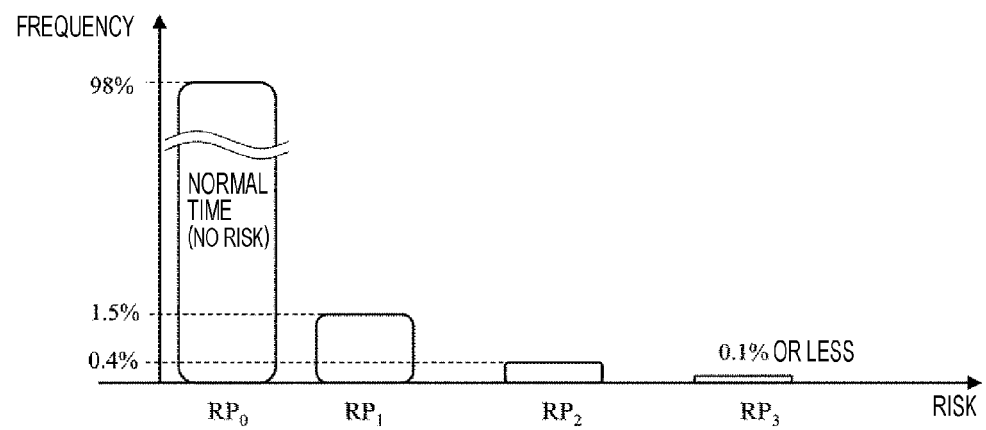
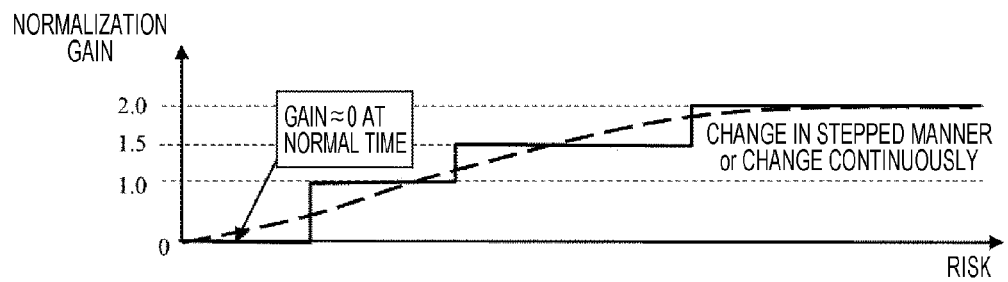
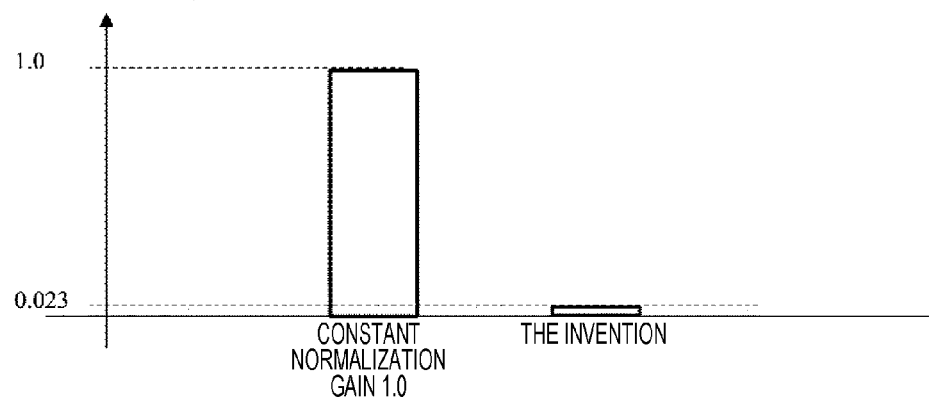

ized by a camera, sets a brake intervention distance based on a relative relation between the subject vehicle and the control target, determines the execution of the brake control when the relative distance between the subject vehicle and the control target is equal to or less than the brake intervention distance so as to intervene in the automatic brake.

VEHICLE MOVEMENT CONTROL SYSTEM

TECHNICAL FIELD

The present invention relates to a vehicle movement control system which controls a longitudinal acceleration and a yaw moment of a vehicle.

BACKGROUND ART

In recent years, there are proposed and practically used various automatic brake control devices for preventing a collision by performing an automatic brake control independent of a driver's brake operation when a subject vehicle is very likely to come into conflict with a control target such as a preceding vehicle. For example, PTL 1 discloses a technique of an automatic brake control device which recognizes a control target in front of the subject vehicle based on a front road environment captured by a camera, sets a brake intervention distance based on a relative relation between the subject vehicle and the control target, determines the execution of the brake control when the relative distance between the subject vehicle and the control target is equal to or less than the brake intervention distance so as to intervene in the automatic brake.

In addition, PTL 2 discloses a vehicle movement control method in which an input lateral jerk (Gy_dot) of the vehicle is multiplied by a gain (KGyV) which is determined from a speed (V) and a lateral acceleration (Gy) and stored in advance, a control command to control the longitudinal acceleration of the vehicle is generated based on the multiplied value, and the generated control command is output. According to this method, since a locus of a resultant acceleration vector (G) of the longitudinal acceleration and the lateral acceleration is vectored to draw a smooth curve in a coordinate system in which the gravity center of the vehicle is fixed, it is called G-Vectoring control (GVC). According to the GVC, it is reported that an emergency avoidance performance is significantly improved (NPL 1).

In addition, PTL 2 discloses a vehicle movement control system which includes a means for detecting a speed (V) in a longitudinal direction of the vehicle and a means for training a jerk (Gy_dot) in a lateral direction of the vehicle, and controls the yaw moment of the vehicle based on a value obtained by subtracting the jerk from the speed. This method is not a feedback control following a model in which the yaw moment is controlled based on lateral slide information of the vehicle and a difference between the yaw movement of the vehicle and a predicted yaw movement of a standard model becomes small. A turning promoting yaw moment generated by a steering and an innate recovery yaw moment of the vehicle are added with a slight assist moment, and thus it is called Moment+ (M+) (NPL 2). For example, as disclosed in PTL 3, an inter-electrical-axle torque generating apparatus (yaw moment generator) may be used for the yaw moment control.

When the M+ control is used, it is possible to improve the turning performance of the vehicle at a low acceleration/deceleration compared to the GVC. For example, when the electrical yaw moment generator of PTL 3 is used, an inter-axle torque difference (that is, a so-called counter torque) can be generated, the yaw moment can be directly added to the vehicle, and the acceleration/deceleration is not generated in the vehicle. In addition, in a case where different decelerating forces are applied to the right and left wheels using a lateral slide preventing apparatus (Electronic Stability Control: ESC) which is recently required to be mounted so as to apply the yaw moment to the vehicle, the deceleration is generated.

However, the deceleration is small compared to the GVC, and the longitudinal and lateral accelerations are changed in a linked manner by the similar profile (appropriate proportion to a vehicle lateral jerk) as the GVC, so that a response performance of the vehicle can be improved without a sudden deceleration caused by the ESC intervention.

CITATION LIST

Patent Literature

PTL 1: Japanese Patent Application Laid-Open No. 2009-262701
PTL 2: Japanese Patent Application Laid-Open No. 2008-285066
PTL 3: Japanese Patent Application Laid-Open No. 2007-139011

Non-Patent Literature

NPL 1: Yamakado, M., Takahashi, J., Saito, S.: "Comparison and combination of Direct-Yaw-moment Control and G-Vectoring Control", Vehicle System Dynamics, Vol. 48, Supplement, pp. 231-254, 2012
NPL 2: Yamakado, M., Takahashi, J., Nagatsuka, K.: "Triple hybrid control of ESC, Moment+ and G-Vectoring", Proc. of Chassis Tech plus 2013, 2013

SUMMARY OF INVENTION

Technical Problem

In PTL 1, a brake control unit investigates whether a steering angle $|\delta|$ set in advance by a driver is equal to or more than a threshold $\delta 0$. In a case where it is determined that the steering angle $|\delta|$ is equal to or more than $\delta 0$, a prohibition timer $t\delta$ is set to define a prohibition time of an expansion brake control.

In addition, the brake control unit investigates whether a steering angular speed $|\delta'|$ ($=|d\delta/dt|$) by the drive is equal to or more than a predetermined threshold $\delta'0$. In a case where it is determined that the steering angular speed $|\delta'|$ is equal to or more than $\delta'0$, the brake control unit sets a prohibition timer $t\delta'$ to define a prohibition time of the expansion brake control.

As described above, in PTL 1, when the steering angle or the steering angular speed by the driver becomes large, a time for prohibiting the brake control is set. In other words, in a case where an emergency avoidance steering operation (in general, the steering angle and the steering angular speed are large) is input by the driver, the avoidance operation is not assisted.

In addition, in the GVC of PTL 2, when a gain (KGyV) to be multiplied to the lateral jerk (Gy_dot) is increased after the control command value of the longitudinal acceleration of the vehicle (particularly, the deceleration command) is established, the deceleration is basically increased, and the speed at the time of the brake operation can be significantly reduced, so that the avoidance performance by the steering is significantly improved. However, since the vehicle sensitively reacts even to a slight steering at the normal time, a discomfort feeling (incompatibility) may be caused to the driver.

Furthermore, because of the sensitive reaction, for example, actuator requirements (responsibility, durability, NVH performance, etc.) at the time of the control operation are tightened, and thus the cost is increased and a range of vehicle modes for the application of the GVC technique is narrowed.

On the other hand, in the M+ of PTL 2, the turning performance at the initial time of the turning is improved, but the deceleration is small at an emergency time such as collision avoidance. Therefore, a component of a speed direction before the avoidance does not sufficiently fall down, and thus although the vehicle is turned around, the vehicle is easily spun while advancing in the speed direction. In addition, since the turning promoting moment is generated, the brake is applied on the rear inside wheels. However, a load moves from the inside wheels to the outside wheels by the lateral acceleration caused by the turning so as to cause a load slipping-off. Therefore, there is concern that a sufficient control effect is not achieved.

An object of the invention is to provide a vehicle movement control system which does not cause discomfort feeling at the normal time and securely assists the driver at the time of emergency avoidance steering.

Solution to Problem

In order to solve the above issue, a vehicle movement control system according to the present invention includes: a risk potential estimation unit which estimates a risk potential of a vehicle based on input environmental information and vehicle information; a vehicle longitudinal movement control unit which generates a longitudinal movement control command of the vehicle based on a lateral jerk of the vehicle and a predetermined gain; a vehicle yawing movement control unit which generates a yawing movement control command of the vehicle based on the lateral jerk of the vehicle and the predetermined gain; and a ratio adjustment unit which adjusts a ratio between the longitudinal movement control command of the vehicle and the yawing movement control command of the vehicle, wherein the ratio adjustment unit adjusts the ratio based on the risk potential estimated by the risk potential estimation unit.

Advantageous Effects of Invention

It is possible to provide a vehicle movement control system which does not cause discomfort feeling at a normal time and securely assists a driver at the time of emergency avoidance steering.

BRIEF DESCRIPTION OF DRAWINGS

FIG. 1 is a diagram illustrating a situation of a G-Vectoring control (GVC) vehicle in a left corner until the vehicle exits a left corner after entering the left corner.

FIG. 3 is a diagram illustrating time series data for comparing running situations under the G-Vectoring control of a normal gain and the G-Vectoring control of a high gain.

FIG. 4 is a diagram illustrating a basic operation of a moment plus (M+) control rule.

FIGS. 5A-5C are diagrams illustrating a movement in a case where a force perpendicular to a speed direction is operated on a mass point.

FIG. 6 is a diagram illustrating a locus in a case where the force perpendicular to the speed direction is operated on the mass point.

FIGS. 7A and 7B are diagrams illustrating a movement in a case where a resultant force of a force perpendicular to the speed direction and a force vertical thereto is operated on the mass point.

FIGS. 12A-12H are diagrams illustrating results of the full vehicle simulation.

FIG. 15 is a diagram illustrating a simulation result under a deceleration control by the G-Vectoring control.

FIG. 16 is a diagram illustrating a simulation result under a moment control by the moment plus control.

FIG. 17 is a diagram illustrating a summary of results of the full vehicle simulation.

FIG. 22 is a diagram illustrating a relation between 1/TTC and a risk potential which are calculated based on the relative relation with the preceding vehicle.

FIG. 23 is a diagram illustrating a relation between a steering angular speed and the risk potential.

FIG. 24 is a diagram illustrating a relation of the risk potential to a difference between a model estimation vehicle lateral movement and an actual vehicle lateral movement.

FIG. 25 is a diagram illustrating a correspondence relation between a quantified risk potential and a qualitative risk level.

FIG. 26 is a diagram illustrating an operational situation of the system of the invention based on the quantified risk potential.

FIG. 28 is a diagram specifically illustrating the operational situation of the vehicle movement control system of the invention based on a command value.

FIG. 29 is a diagram conceptually illustrating a configuration of the vehicle movement control system of the invention.

FIG. 33 is a diagram for describing alleviation of requirements for a longitudinal movement linked with the lateral movement, and for an actuator for realizing a yawing movement.

DESCRIPTION OF EMBODIMENTS

Figure 2:
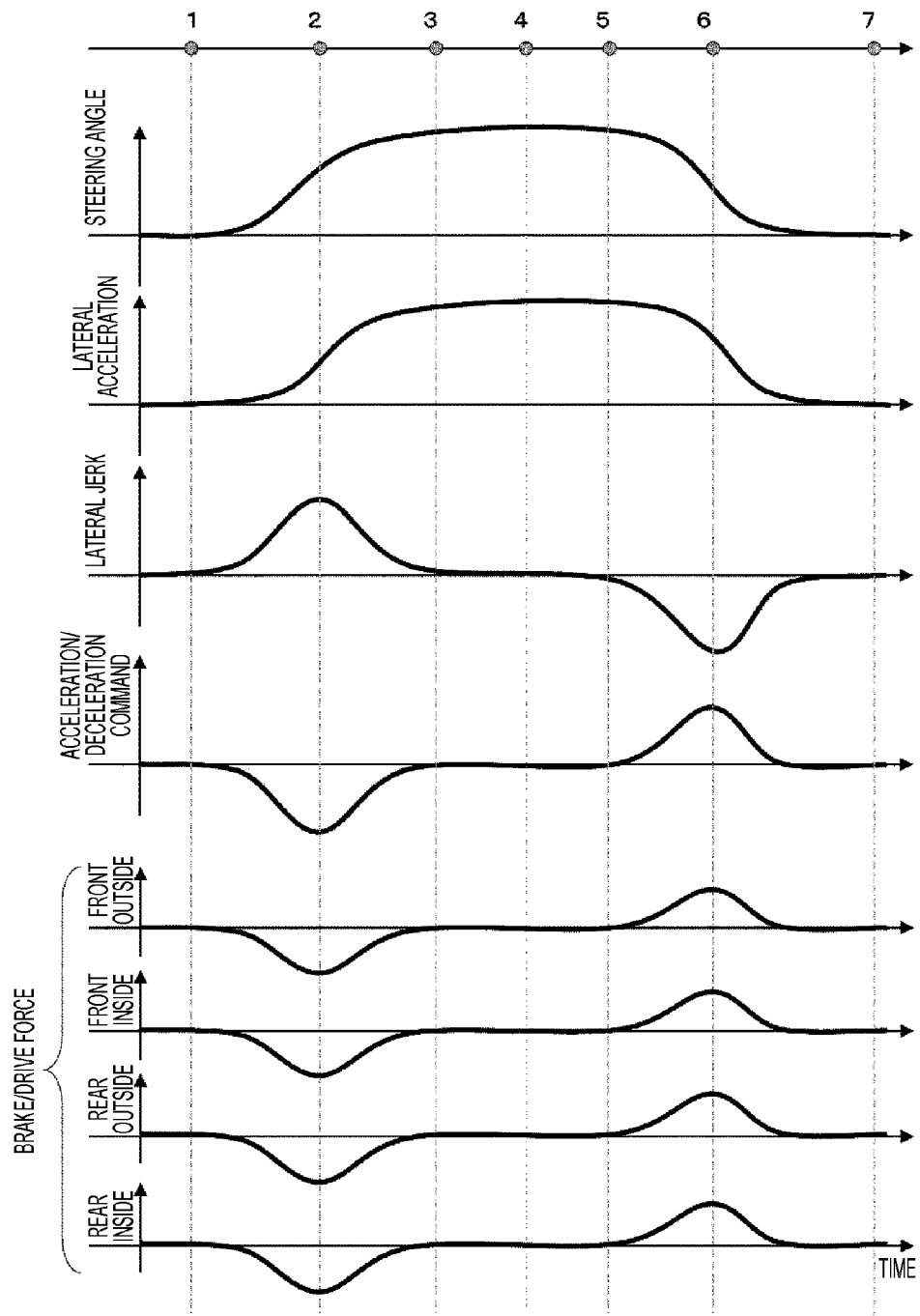
FIG. 2 is a diagram illustrating time series data in a case where the vehicle runs as illustrated in FIG. 1.

First, basic approaches to solve the problem will be described, and the configurations and embodiments will be described.

The effect of the invention from the viewpoint of improvement in movement performance at the time of emergency avoidance can be directly described as follows.

At least, there is provided a unit which includes a mode of controlling a longitudinal acceleration/deceleration linked with the lateral movement of the vehicle and a mode of controlling a yaw moment linked with the lateral movement of the vehicle, and quantitatively evaluates a risk potential based on environmental information or in-vehicle information. In a case where the risk potential becomes large, an operation ratio of a longitudinal acceleration control (herein, the deceleration) linked with the lateral movement is set to be large, an operation ratio of the yaw moment control is set to be small, the speed is significantly reduced, and a speed in a direction (a direction away from an obstacle) opposed to a resultant force added to the vehicle is maximized compared to a case where the risk potential is small or zero, so that the emergency avoidance performance is improved.

First, the description will be made about the outline of the longitudinal acceleration control and the yaw moment control linked with the lateral movement, an influence of the longitudinal acceleration control and the yaw moment control on a vehicle behavior at the initial time of avoidance which acts as a dominant factor against the improvement of the emergency avoidance performance, and then the accurate operation ratios of both controls.

<Longitudinal Acceleration Control (G-Vectoring) Linked with Lateral Movement>

NPL 1 discloses a method of shifting a load between the front wheels and the rear wheels by automatically accelerating and decelerating the vehicle linked with the lateral movement through handle operations so as to improve controllability and stability of the vehicle. A specific acceleration/deceleration command value (target longitudinal acceleration Gxc) can be expressed as the following Expression 1.

[Expression 1]

$$G_{xc} = -\text{sgn}(G_y - \dot{G}_y)\frac{C_{xy}}{1+Ts}|\dot{G}_y| + G_{x\_DC} \quad \text{※} \dot{G}_y = \text{Gy\_dot} \quad (1)$$

Basically, it is a simple control rule in which a gain Cxy is multiplied to a lateral jerk Gy_dot, and subjected to a primary delay so as to set the resultant value as a longitudinal acceleration/deceleration command.

Further, Gy represents a vehicle lateral acceleration, Gy_dot represents a vehicle lateral jerk, Cxy represents a gain, T represents a primary delay time constant, s represents a Laplacian operator, and Gx_DC represents an acceleration/deceleration command unlinked with the lateral movement.

With this control method, it has been confirmed through NPL 1 on that a control strategy in which the lateral movement and the longitudinal movement of an expert driver are unlinked can be partially simulated, and controllability and stability of the vehicle can be improved.

The parameter Gx_DC in the equation is a deceleration component (offset) unlinked with the lateral movement. The parameter is a term required in a case where the deceleration is predicted for a forward corner, or a case where a section speed command is issued. In addition, the term sgn (signum) is provided to obtain the above operation with respect to both of a right corner and a left corner. Specifically, it is possible to realize an operation in which the vehicle is decelerated at the time of steering start, the deceleration is stopped when the turning is normally ended (since the lateral jerk becomes zero), and the vehicle is accelerated at the time of starting the steering return when the vehicle exits the corner.

Through such a control, a resultant acceleration (denoted with "G") of the longitudinal acceleration and the lateral acceleration is vectored to be shifted in a curve with time in a diagram of which the horizontal axis indicates the longitudinal acceleration of the vehicle and the vertical axis indicates the lateral acceleration of the vehicle, so that the control is called "G-Vectoring control".

The vehicle movement in a case where the control of Expression 1 is applied will be described using a specific running example.

FIG. 1 illustrates a general running scene of entering and exiting the corner such as a straight path A, a transition section B, a normal turning section C, a transition section D, and a straight section E. At this time, it is assumed that a driver does not perform an accelerating/decelerating operation.

In addition, FIG. 2 is a diagram illustrating a time-history waveform of a steering angle, a lateral acceleration, a lateral jerk, the acceleration/deceleration command calculated in Expression 1, and brake and drive forces of four wheels. While being described in detail below, a brake force and a drive force are distributed equally to the left and right (inside and outside) wheels, that is, a front outside wheel, a front inside wheel, a rear outside wheel, and a rear inside wheel. Herein, the brake and drive force is a generic term of a force generated in the longitudinal direction of each wheel, the brake force is a force to decelerate the vehicle, and the drive force is defined as a force to accelerate the vehicle.

First, the vehicle enters the corner from the straight path section A. In the transition section B (Points 1 to 3), the lateral acceleration Gy of the vehicle is increased as the driver gradually turns the steering. The lateral jerk Gy_dot becomes a positive value during a period when the lateral acceleration in the vicinity of Point 2 is increased (returning to zero at a time point of 3 when the increase of the lateral acceleration is ended). At this time, a deceleration (Gxc is negative) command is generated by Expression 1 in a control vehicle as the lateral acceleration Gy is increased. Accordingly, almost the same brake force (minus sign) is applied to the front outside, front inside, rear outside, and rear inside wheels.

Thereafter, when the vehicle enters the normal turning section C (Points 3 to 5), the driver stops turning the steering, and holds the constant steering angle. At this time, since the lateral jerk Gy_dot becomes 0, the acceleration/deceleration command Gxc becomes 0. Therefore, the brake force and the drive force of each wheel also become zero.

Next, in the transition section D (Points 5 to 7), the driver operates to return the steering so that the lateral acceleration Gy of the vehicle is reduced. At this time, the lateral jerk Gy_dot of the vehicle becomes negative, the acceleration command Gxc is generated in the control vehicle based on Expression 1. Accordingly, almost the same drive force (plus sign) is applied to the front outside, front inside, rear outside, and rear inside wheels.

In addition, in the straight section E, the lateral jerk Gy becomes 0 and the lateral jerk Gy_dot also becomes zero, and thereby the acceleration/deceleration control is not performed. As described above, the vehicle is decelerated from the time of the steering start (Point 1) to a clipping point (Point 3), stops decelerating during a normal circular turning (Points 3 to 5), and is accelerated from the time of starting the steering return (Point 5) to the time (Point 7) of exiting the corner. In this way, when the G-Vectoring control is applied to the vehicle, the driver can realize the acceleration/deceleration movement linked with the lateral movement only by steering the vehicle for the turning.

In addition, when the movement is expressed by a "g-g" diagram illustrating an acceleration state of the vehicle, in which the horizontal axis represents the longitudinal acceleration and the vertical axis represents the lateral acceleration, the movement is featured as a movement shifting in a smooth curve (drawing a circle). The acceleration/deceleration command of the invention is generated to be shifted in a curve with time in the diagram. In the case of the left corner, the shifting in a curve shape becomes a shifting in a clockwise direction as illustrated in FIG. 1. In the case of the right corner, the shifting follows a shifting path inversed with respect to the Gx axis, and the shifting direction becomes a counterclockwise direction. In such a shifting, a pitching movement generated in the vehicle by the longitudinal acceleration is suitably linked with a roll movement generated by the lateral acceleration, and peak values of a roll rate and a pitch rate are reduced.

As illustrated in FIG. 1, when the control is considered without the primary delay term and a sign function of the right and left movements, the value obtained by multiplying a gain $-Cxy$ to the vehicle lateral jerk is set to a longitudinal acceleration command. Therefore, the deceleration or the acceleration can be made large with respect to the same lateral jerk by increasing the gain.

FIG. 3 is a diagram illustrating a turning situation in a state of running at a normal gain in the same situation as that of FIGS. 1 and 2 and in a state of a high gain. When the gain is set to be large, the deceleration at the time of the turning start becomes large, and the vehicle speed is lowered compared to that at the time of the normal gain. The lateral acceleration becomes small even with respect to the same steering. When being compared to the "g-g" diagrams of the high gain and the normal gain leading to the improvement in stability at the time of turning, the lower portion of FIG. 3 can be obtained. The curve of the diagram is maintained, but expanded in the Gx direction. The curve in the Gy direction is influenced by a speed reduction, and tends to be slightly narrow.

On the other hand, in a case where the gain is always set to the high gain, a large acceleration and deceleration occurs even in a minute steering correction, and the driver and the passenger feel a strong deceleration and a pitching movement. Therefore, in general, the gain Cxy of the GVC is adjusted to be about 0.25 at which the control effect and the feelings are balanced. However, it is confirmed that the avoidance performance is significantly improved when the gain is desirably increased at the time of emergency change.

<Yaw Moment Control linked with Lateral Movement (Moment Plus (M+)) (FIG. 4)>

The moment plus is a new control rule reported in NPL 2 in which the yaw moment is added to the vehicle based on a command value of the G-Vectoring Control (GVC) (that is, using lateral jerk information) so as to improve the controllability and the stability of the vehicle. The basic control rule is formulated as the following Expression 2.

[Expression 2]

$$M_+ = -\text{sgn}(G_y \cdot \dot{G}_y)\frac{-C_{mn}}{1+T_{mn}s}|\dot{G}_y| \approx C_{mn}\dot{G}_y \qquad (2)$$

As shown in Expression 2, when the control is considered without the primary delay term and the sign function of the right and left movements, the value obtained by multiplying a gain Cmn to the vehicle lateral jerk is set to a moment command similarly to the GVC.

In addition, the stability of the vehicle movement generally comes to be lowered as the speed is increased. Therefore, in the case of a turning promoting moment, the stability of the vehicle can be effectively secured when the moment becomes small as the speed is increased (see NPL 3: Yamakado, M., Nagatsuka, K.: Study on Yaw Moment Control Method Based on Vehicle Lateral jerk (2), Transactions of the Society of Automatic Engineers of Japan: pp 60-13: 21-26, 2013).

Therefore, as shown in the following Expression 3, it is considered that a method of adding the control moment in inverse proportion to the speed is also effective particularly to a vehicle of an oversteer trend.

$$M_{+/V} = -\text{sgn}(G_y \cdot \dot{G}_y)\frac{-C_{mn}}{1+T_{mn}s}\left|\frac{\dot{G}_y}{V}\right| \approx C_{mn}\frac{\dot{G}_y}{V} \qquad \text{[Expression 3]}$$

Of course, when the speed is lowered, the moment command value becomes significantly large. Therefore, a speed lower limiter may be provided to stop the control, or a control amount may be fixed to a very low speed.

In the M+ control, a yawing movement control is directly controlled. Therefore, a spin feeling (that is, a tea-cup feeling in amusement park) may occur instead of the turning. However, in a case where the M+ control is realized by the brake control by the ESC, the M+ control can be realized at a small deceleration which is not enough compared to the GVC to obtain the same yaw response. Furthermore, the deceleration at that time is accordingly in appropriate proportion to the lateral jerk, and becomes equal to the deceleration in a case where the GVC is performed at a low gain (the resultant acceleration is vectored), so that an improvement in smooth ride can be expected.

Therefore, an excessive deceleration and the pitching movement felt by the driver and the passenger can be reduced while improving the yaw response performing only the M+ control while stopping the GVC, or by increasing a ratio of the M+ control with respect to the GVC in a range not making the above-described feeling tough.

<Guideline of Ratio Share between Deceleration Control and Yaw Moment Control in Emergency Avoidance (Calculation at Mass Point)>

Since the GVC is only used for controlling the longitudinal acceleration/deceleration, and the M+ control is used for controlling the yawing movement, these controls can be combined in a non-interference manner. Therefore, the control can be performed by arbitrarily determining any one of the GVC and the M+ control as a main control. As described in the M+ control, it is desirable that the ratio of the M+ control be increased (for the feeling) at least in a normal region.

Herein, the description will be made about an influence of the longitudinal acceleration control and the yaw moment control on the vehicle behavior at the initial time of avoidance which acts as a dominant factor in the improvement of the emergency avoidance performance, and then a guideline on the way of sharing the ratio between the GVC and the M+ control will be described. Therefore, first, the vehicle at the time of starting the turning is regarded as a mass point (the yawing movement is not considered in this case), and the influence of the deceleration will be analytically considered. Then, a guideline on the ratio share between the GVC and the M+ control will be described through numerical calculation of the full vehicle simulation also in consideration of the degree of yaw freedom.

Further, the steering return after avoiding an obstacle and the stability secure are assumed to be performed by the ESC. Herein, the most-important part of the description about that the vehicle avoids the obstacle at the beginning will be specialized.

<Movement of Mass Point Under Pure Lateral Force>

Herein, it is assumed that the mass point having a mass m moves at a speed v (FIG. 5A). When an external force F perpendicular to a speed direction is applied to the mass point, an acceleration a is generated, and a relation of F=ma is established.

Assuming that the movement is instant, it is equivalent to a state where a centripetal force F is applied to the mass point turning (circular movement) at a predetermined speed v (FIG. 5B). In addition, a relation between the state and the vehicle is illustrated in FIG. 5C (a=Gy). It can be considered that the external force F applied in a direction perpendicular to the speed direction is a centripetal force and the acceleration Gy generated in a direction toward the turning center is a centripetal acceleration. When a rotation angular speed in the turning movement is set to ω, the centripetal acceleration Gy becomes vω, and the relation of the following Expression 4 is known.

[Expression 4]

$$F = mG_y = mv\omega = \frac{mv^2}{R} \quad (4)$$

In this way, the instant movement in which the lateral force is applied to the vehicle running at a constant speed can be handled as the turning movement, and the lateral acceleration Gy can be expressed by a turning radius R and a turning angular speed ω.

FIG. 6 is a diagram illustrating a locus until after Δt in the movement state described above using a fixed coordinate system in which the reference coordinate is fixed to a space. The mass point enters the corner from the origin P (0, 0) of the coordinate in the X direction at the speed v and in parallel with the X axis. The turning center of the mass point becomes the origin O (0, R) on the Y axis. The mass point after Δt comes to move to Q (R sin ω·Δt, R (1−cos ω·Δt)). When a preceding vehicle (obstacle) does not interfere in the locus, the avoidance becomes successful.

<Movement of Mass Point in Lateral Force Containing Speed Direction Component (GVC)>

Since the GVC is an acceleration/deceleration control linked with the lateral movement, a deceleration Gx and a decelerating force Fx in the same direction as the speed is applied in addition to an external force component Fy perpendicular to the speed direction described above (FIG. 7A).

As a result, the magnitude of a resultant vector FGVC of the external force is expressed by the following Expression 5.

[Expression 5]

$$F_{GVC} = \sqrt{F_x^2 + F_y^2} = \frac{F_y}{\cos\gamma} \quad (5)$$

In this case, γ indicates an angle formed between the external force component Fy perpendicular to the speed direction and a total sum FGVC of the external force.

Since cos γ<1, this requires attention to the fact that the resultant vector is larger than the external force component perpendicular to the speed direction.

Similarly to FIG. 5A, such a state of the speed and the external force is illustrated in the upper portion of FIG. 7B. As illustrated in the lower portion of FIG. 7B, the speed is considered by dividing a component v cos γ in a direction perpendicular to the resultant force FGVC (the resultant acceleration aGVC) and a parallel component v sin γ. First, focusing only to v cos γ, the state can be considered as a state where the acceleration aGVC is generated and a relation of FGVC=m·aGVC is established when an external force FGVC perpendicular to the speed direction is applied to the mass point having a mass m moving at the speed v cos γ.

The external force FGVC applied in a direction perpendicular to the speed direction (v cos γ) can be considered as a centripetal force, and the acceleration aGVC generated in a direction toward the turning center can be considered as a centripetal acceleration. When the rotation angular speed in the turning movement is set to ωGVC, the centripetal acceleration aGVC is v cos γ·ωGVC, and the relation of the following Expressions 6 and 7 is established.

[Expression 6]

$$F_{GVC} = ma_{GVC} = m \cdot v\cos\gamma \cdot \omega_{GVC} = \frac{m(v\cos\gamma)^2}{R_{GVC}} \quad (6)$$

A turning radius RGVC is obtained from the above Equation as follows.

[Expression 7]

$$R_{GVC} = \frac{m(v\cos\gamma)^2}{F_{GVC}} = \frac{m(v\cos\gamma)^2\cos\gamma}{F_y} = \cos^3\gamma \cdot R \quad (7)$$

Figure 8:
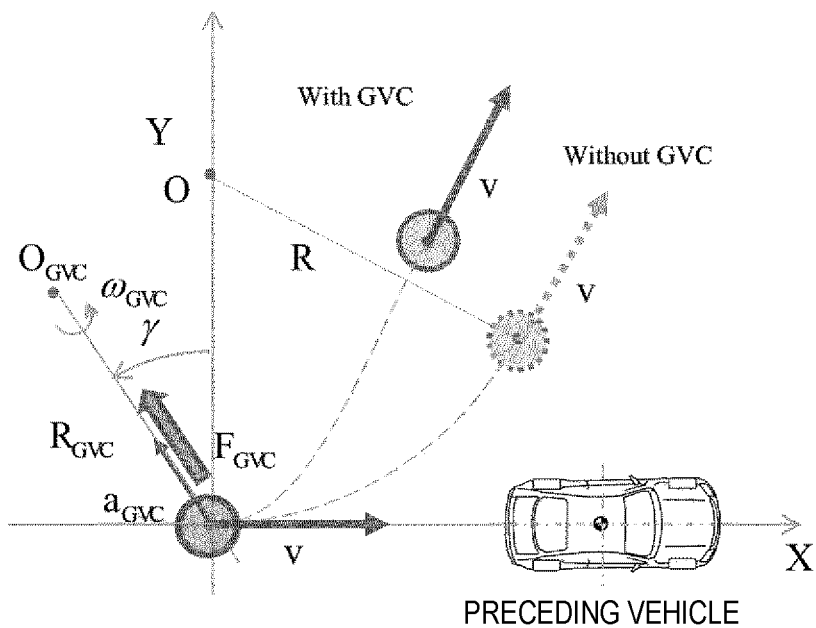
FIG. 8 is a diagram illustrating a locus in a case where the resultant force of the force perpendicular to the speed direction and the force vertical thereto is operated on the mass point.

Since cos γ<1, this requires attention to that the turning radius RGVC becomes a small value compared to R in a case where a pure lateral force is applied (referred to as no-control for convenience sake) (FIG. 8). Furthermore, it can be seen that the turning center OGVC is inclined backward by an angle γ with respect to the Y axis. The coordinates of the turning center OGVC become OGVC(-R cos 3γ·sin γ, R cos 4γ).

In addition, similarly to FIG. 4, when a rotation angular speed ωGVC is obtained in order to consider the locus until after Δt, the rotation angular speed is expressed by the following Expression 8.

[Expression 8]

$$\omega_{GVC} = \frac{\omega}{\cos^2 \gamma} \quad (8)$$

It can be seen that the rotation angular speed is also increased compared to the case of no-control.

Eventually, when only the speed component v cos γ in a direction perpendicular to the resultant force FGVC (the resultant acceleration aGVC) is considered, it can be seen that the mass point moves from the original point P to the point (A), when viewed from the initial position, in a state where Point OGVC in the rear of the speed component is set as the turning center, the turning radius RGVC is smaller than the case of no-control, and the rotation angular speed ωGVC is also large in the same time period. The coordinate of the point (A) becomes A(R cos 3γ·sin {γ+(ω/cos 2γ)·Δt}-R cos 3γ·sin γ, R cos 3γ[cos γ-cos {γ+(ω/cos 2γ)·Δt}]).

Next, when the component v sin γ in parallel with the resultant force FGVC (the resultant acceleration aGVC) is considered, it can be seen that the mass point moves to the point (B) proceeding by v sin γ·Δt on an extension of the straight line connecting the turning center OGVC and the point (A). Therefore, the coordinate of Point B becomes A (R cos 3γ·sin {γ+(ω/cos 2γ)·Δt}-R cos 3γ·sin γ+v sin γ·cos (γ+(ω/cos 2γ)·Δt-π/2), R cos 3γ[cos γ-cos {γ+(ω/cos 2γ)·Δt}]+v sin γ·sin (γ+(ω/cos 2γ)·Δt-π/2)). When the preceding vehicle (obstacle) does not interfere in the locus, the avoidance becomes successful.

Figure 9:
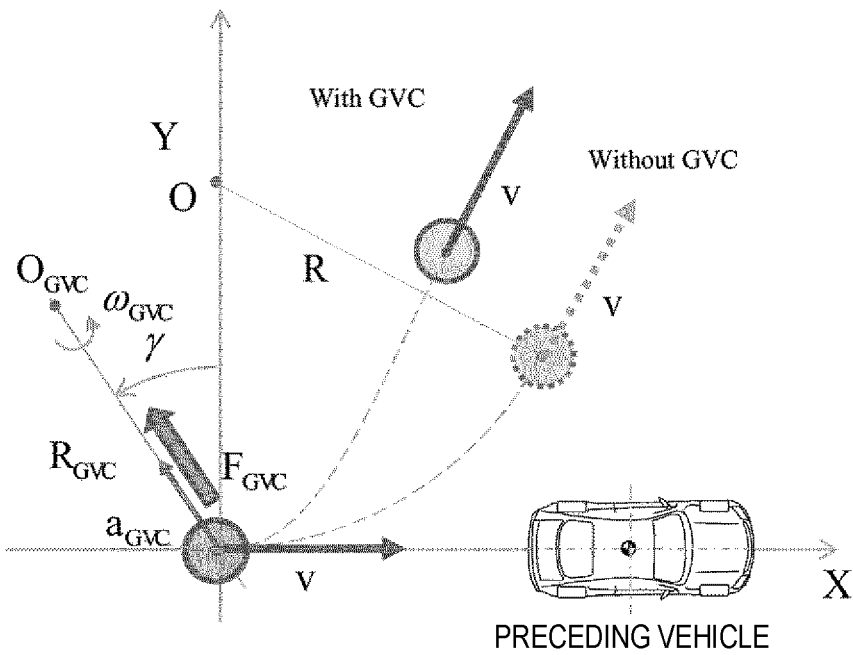
FIG. 9 is a diagram for comparing loci in a case where the force perpendicular to the speed direction is operated on the mass point and in a case where the resultant force of the force perpendicular to the speed direction and the force vertical thereto is operated on the mass point.

As illustrated in FIG. 9, when the external force FGVC having the component in parallel with the speed direction is added (control) to the mass point passing through the origin point at the speed v in addition to the external force having only the component perpendicular to the speed direction (no-control), it can be seen that the locus of the mass point passes through the inside at least at the initial time of the turning. When the preceding vehicle (obstacle) does not interfere in the locus, the avoidance becomes successful. From the drawing, it can be clearly seen that the vehicle can effectively avoid the obstacle when the GVC (deceleration control) is performed compared to the case of no deceleration control (that is, the avoidance only by the steering).

In addition, in a case where the control is performed, it requires attention to that the absolute value of the applying force is larger than that in the case of no-control. This is equivalent to that not only the lateral force of the tire but also the longitudinal force is used as a centripetal force against a centrifugal force. In other words, even a narrow tire having a small rolling resistance can bear the turning force by effectively using the longitudinal force.

The above description is about the movement of the mass point, and the yawing movement of the vehicle is not able to be considered. Inversely, in a case where an electric yaw moment control device not accompanied by the acceleration and deceleration is used, the effect of the inside locus (that is, the avoidance performance at the initial time of the emergency avoidance) is not achieved in the mechanism described above. Since this is a case in which only the movement of the mass point is considered, the investigation will be made in detail by the following analysis using a full vehicle model (rotational movements such as yaw, roll, and pitch can also be considered).

<Guideline of Ratio Share Between Deceleration Control and Yaw Moment Control in Emergency Avoidance (Verification by Simulation)>

The movement of the mass point described above has been verified in detail from the viewpoint of the movement of the turning center when the deceleration control is performed particularly at the time of turning through a vehicle movement simulation (assuming an L turn for the sake of simplicity) using the full vehicle model. Of course, it is considered that the emergency avoidance performance and a safety feeling of the driver are increased when the turning center is away from the obstacle and in front.

<Simulation Conditions>

Figures 10, 11:
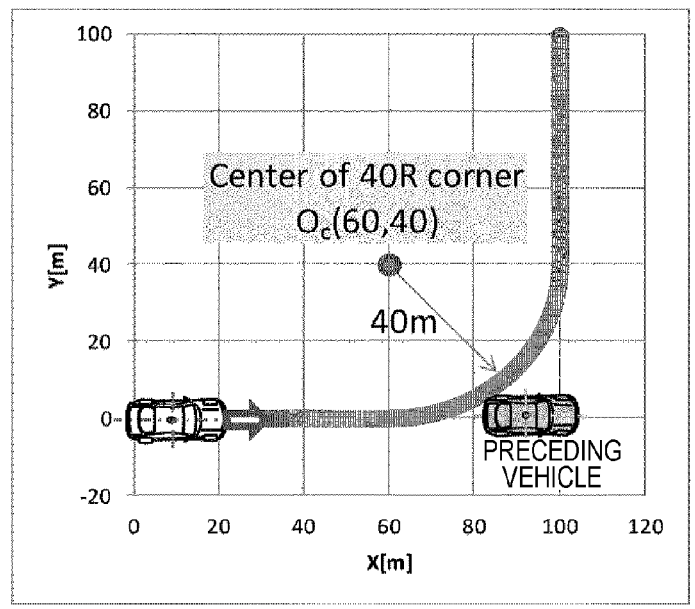
FIG. 10 is a diagram illustrating an L-turn course using a full vehicle simulation.
FIG. 11 is a diagram illustrating conditions of the full vehicle simulation.

The simulation conditions are shown in Table 1. A road surface is assumed as a dry asphalt road, an entry speed is 80 km/h, and the radius of the L turn is 40 m (FIG. 10). A magic formula model in which a non-linear combined tire force can be taken into consideration is used as a tire model. In addition, a driver model is calculated using a general secondary prediction forward watching model. A state when an avoidance operation is performed assuming a locus of the L turn having a radius of 40 m when there is an obstacle in front is simulated.

As illustrated in FIG. 11, there are control cases: (i) no-control is a case where the L turn is cleared only by the steering without adding the brake force of the brake; (ii) is a case where the deceleration by the GVC is performed, and (iii) is a case where Moment+ control is performed to apply a moment in the turning promoting direction by applying the brake force to the rear inside wheel (the rear left wheel) based on a command value (corresponding to the lateral jerk) of the GVC.

<Simulation Result (Analysis in Moving Coordinate System)>

FIG. 12A illustrates the steering angle, FIG. 12B illustrates a relation between a steering angle and a yaw rate, FIG. 12C illustrates a lateral slide angle, FIG. 12D illustrates a vehicle speed, and FIG. 12E illustrates a comparison of the "g-g" diagram. In addition, FIGS. 12F-12H illustrate the time-history waveforms of the vehicle longitudinal acceleration and the vehicle side-slip acceleration in each control condition.

Similarly to the actual vehicle experiment in the related art (NPL 1), in no-control condition, a yaw rate response to the steering angle is saturated FIG. 12B, and the steering angle is significantly increased FIG. 12A. In addition, referring to FIG. 12F, the deceleration occurs due to a tire drag regardless of performing no deceleration control in the latter half of the cornering, and referring to the vehicle speed of FIG. 12D, the speed is lowered to almost the same degree as the other two cases where the brake control is performed.

Next, paying attention to the Moment+ control, the deceleration at the initial time of the turning is small FIG. 12H, the yaw rate response is high FIG. 12B, but the negative lateral slide angle and the yaw rate are steeply increased from about 3.5 seconds, and as a result a countersteering operation is required FIG. 12A. This indicates a situation in which the gain cannot be increased anymore in the M+ control. Therefore, the deceleration cannot be obtained any more by the M+ control, and it suggests that the deceleration control by the GVC is necessarily added.

The GVC shows a balanced simulation result with respect to these two cases.

<Simulation Result (Analysis in Space Fixed Coordinate System)>

Even in the result described above, it is expected that the GVC will qualitatively increase the safety feeling compared to no-control and the Moment+ control. However, in a case where the gain of the Moment+ control is lowered to reduce the yaw rate response to a certain level for example, there is a question about that the safety feeling will be improved. In addition, in a case where a gain tuning is performed as described above, the deceleration is further lowered. Herein, a vehicle running locus obtained in the simulation and the resultant acceleration applied to the vehicle are shown in the space fixed coordinate system, and three cases will be compared.

<Calculation of Turning Center>

The coordinates (X(i), Y(i)) on the XY plane in each time point are obtained by the simulation. Therefore, the following Expression 9 is obtained from these values.

[Expression 9]

$$X'[i] = \frac{X[i] - X[i-1]}{\Delta t}, Y'[i] = \frac{Y[i] - Y[i-1]}{\Delta t} \Rightarrow$$
$$X''[i] = \frac{X'[i] - X'[i-1]}{\Delta t}, Y''[i] = \frac{Y'[i] - Y'[i-1]}{\Delta t}$$
(9)

Therefore, when a momentary path curvature κ[i] of each time point is obtained with reference to Literature 5, the following Expression 10 is obtained.

[Expression 10]

$$\kappa[i] = \frac{X'[i] \cdot Y''[i] - X''[i] \cdot Y'[i]}{\{(X'[i])^2 + (Y'[i])^2\}^{\frac{1}{2}}}$$
(10)

The momentary turning radius R[i] is expressed as the following Expression 11.

[Expression 11]

$$R[i] = \frac{1}{\kappa[i]}$$
(11)

Figure 13:
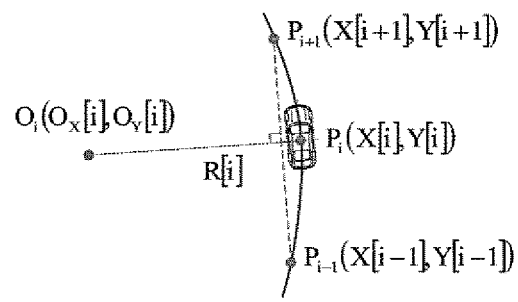
FIG. 13 is a diagram illustrating a relation between a vehicle running locus and an instant turning center.

FIG. 13 is a diagram illustrating the coordinates, the turning radius, and the turning center. The Pi−1Pi+1 component of the vector connecting a (i−1)th position and a (i+1)th position of the vehicle is expressed as the following Expression 12.

[Expression 12]

$$\overrightarrow{P_{i-1}P_{i+1}} = (X[i+1] - X[i-1], Y[i+1] - Y[i-1])$$
(12)

In addition, the OiPi component of the vector connecting an i-th turning center and an i-th vehicle position is expressed as the following Expression 13.

[Expression 13]

$$\overrightarrow{O_iP_i} = (X[i] - O_X[i], Y[i] - O_Y[i])$$
(13)

Since the vector Pi−1Pi+1 and the vector OiPi are orthogonal to each other, and a norm value of the vector OiPi is the turning radius R[i], the relations of the following Expressions 14 and 15 are established.

[Expression 14]

$$\overrightarrow{P_{i-1}P_{i+1}} \cdot \overrightarrow{O_iP_i} = (X[i+1] - X[i-1])(X[i] - O_X[i]) + \qquad (14)$$
$$(Y[i+1] - Y[i-1])(Y[i] - O_Y[i]) = 0$$

[Expression 15]

$$(X[i] - O_X[i])^2 + (Y[i] - O_Y[i])^2 = (R[i])^2 \qquad (15)$$

Therefore, the i-th turning center Oi(OX[i], OY[i]) is expresses as the following Expression 16.

[Expression 16]

$$O_1(O_X[i], O_Y[i]) = \qquad (16)$$
$$\left( X[i] - \frac{R[i]}{\sqrt{1 + \left(\frac{X[i+1] - X[i-1]}{Y[i+1] - Y[i-1]}\right)^2}}, Y[i] - \frac{X[i+1] - X[i-1]}{Y[i+1] - Y[i-1]} \frac{R[i]}{\sqrt{1 + \left(\frac{X[i+1] - X[i-1]}{Y[i+1] - Y[i-1]}\right)^2}} \right)^T$$

<Calculation of Direction of Resultant Acceleration in Space Fixed Coordinate System>

In the moving coordinate system of the vehicle, an angle γ[i] of the resultant acceleration with respect to the lateral direction of the i-th vehicle can be expressed by the following Expression 17.

[Expression 17]

$$\gamma[i] = \text{ATAN}\left(\frac{G_x[i]}{G_y[i]}\right) \qquad (17)$$

The angle is necessarily added with an angle θ (yaw angle) of the vehicle with respect to the space fixed system for the change into the fixed coordinate system. The yaw angle is an accumulated value of the yaw rate r[j], and can be calculated by the following Expression 18.

[Expression 18]

$$\theta[i] = \sum_{j=1}^{I} r[j] \cdot \Delta t \qquad (18)$$

In this calculation, Δt is 0.01 second.

<Evaluation Result of Turning Center and Resultant Acceleration>

Figure 14:
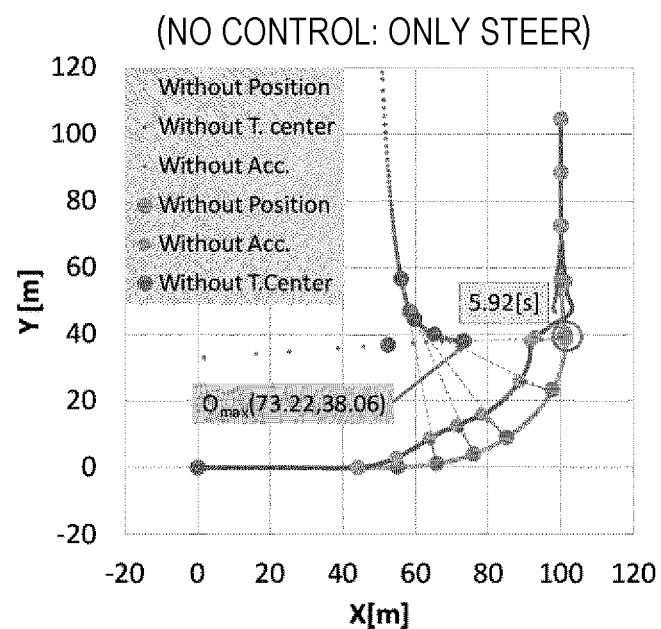
FIG. 14 is a diagram illustrating a simulation result under no-control.

Using the above equations, the calculation results of the vehicle position, the turning center, a terminal position in the space fixed coordinate system of the resultant acceleration vector added to the vehicle with respect to no-control, the GVC, and the Moment+ control are illustrated in FIGS. 14, 15, and 16. The results are plotted in unit of 0.5 seconds from 2 to 4 seconds when the cornering starts, and the other portions are plotted in unit of 1 second. The resultant acceleration vector is obtained by connecting the vehicle position and the terminal position of the resultant acceleration vector (the results are illustrated on a magnified scale by 10 times in order to be easily recognizable (arrow). Herein, [G] is a unit). In addition, a dotted line is drawn from the vehicle position toward an instant turning center at the time point.

The round frame in the drawing shows the vehicle position and the time at that position when the X coordinate of the instant turning center is maximized, that is, when the vehicle enters the corner and the turning center moves to the most-inner portion. The time and the coordinate of the turning center at that time, and a difference from the turning center of a target path are listed in FIG. 17.

(ii) In the GVC, the resultant vector forms an angle backward with respect to the direction of the turning center at the initial time of the turning (see the time series data of FIG. 12A-12H), the turning center is determined at 4 seconds, and the normal turning starts. On the contrary, (i) in the no-control, the turning center is gradually dragged to the inner side until the L turn is ended, the speed is lowered due to the tire drag as illustrated in FIG. 12F, and finally the deviation of the turning center is stopped. (iii) In the Moment+, an intermediate characteristic between the GVC and the no-control appears, but referring to the time series data of FIG. 12H, the result is similar to the case of the no-control regardless of the lateral acceleration that is raised earlier than the GVC. Herein, as described above, in a case where the gain of the Moment+ is lowered and the yaw rate response is lowered to some degrees, the dragging degree of the turning center and the time taken for convergence are increased.

Referring to a difference from the turning center in FIG. 17, the vehicle approaches the obstacle as the difference in the X-axis direction is increased in the positive direction and the difference in the Y-axis direction is increased in the negative direction. Accordingly, it can be seen that the GVC has a high emergency avoidance performance compared to the no-control and the M+.

From the above results, it is effective that the deceleration control is performed with priority at the time of emergency avoidance according to the result obtained by analyzing the vehicle as the mass point and the result obtained by the numerical calculation using the full vehicle model. When the yaw moment is controlled in the turning promoting direction in the emergency avoidance operation (that is, the brake force is applied to the rear wheel on the turning inside), the lateral force limit of the rear wheel is easily lowered, the lateral slide angle becomes large, the stability is easily damaged, the deceleration cannot be secured, and the avoidance performance is easily lowered. On the contrary, in the GVC where the brake force is applied to four wheels so as to decelerate the vehicle, the speed is lowered, furthermore the turning radius is small, and the turning center is effectively away from the obstacle. Therefore, it is found out that a large ratio of the deceleration control of the GVC at the time of emergency avoidance is effective compared to the moment control by the M+ control.

<Guideline of Ratio Share Between Deceleration Control and Yaw Moment Control in Emergency Avoidance (Actual Vehicle Verification)>

Figure 18:
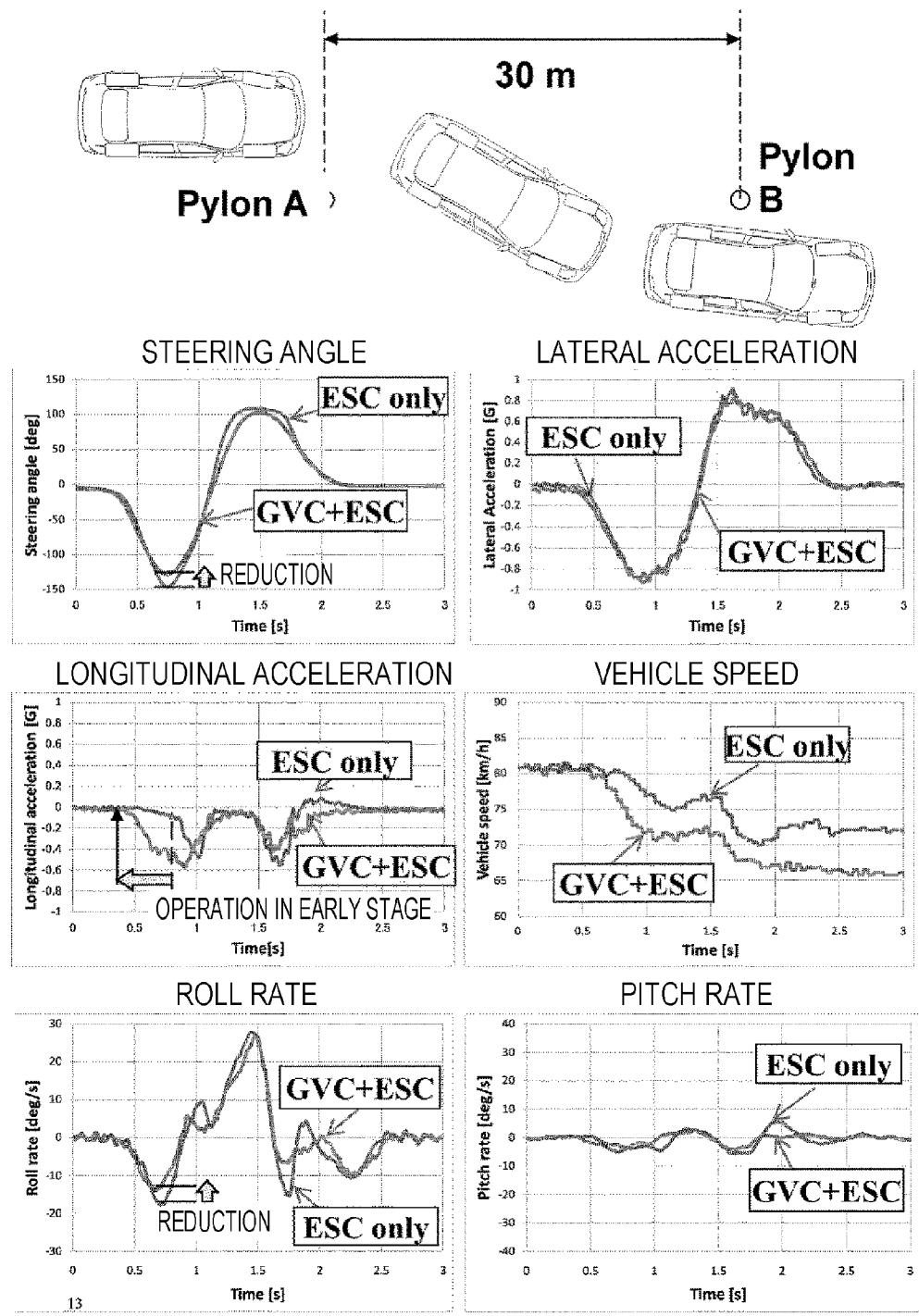
FIG. 18 is a diagram illustrating an operational situation of only ESC and a hybrid control at the time of lane change.

By the way, FIG. 18 is a diagram for comparing a state where only the yaw moment control by the ESC is performed on the steering angle, the longitudinal acceleration, the lateral acceleration, and the vehicle speed with a state where the yaw moment control by combining the GVC and the ESC is performed, when a lane change is simulated in which a pylon A and a pylon B are disposed 30 m away from each other, the vehicle passes by a pylon A on the right, and moves to the left side of a pylon B. A yaw moment control logic of the ESC is different from that of the M+, but it is considered that the logic is sufficient for comparing and evaluating the deceleration control and the moment control.

In the control linked with the GVC and the ESC, the speed is lowered by 10 km/h at 0.5 seconds after the deceleration is worked since the steering starts compared to the case where only the yaw moment control of the ESC is performed.

Therefore, the steering angle is also small, the roll rate and the pitch rate are significantly reduced, and thus the lane change is safely made. Furthermore, as described above, a large speed can be automatically reduced for the same task by increasing the gain Cxy of the lateral jerk, so that the avoidance performance can be significantly improved. Even in this case, the superiority of the GVC at the time of emergency avoidance can be confirmed.

<Actuator Requirements>

On the other hand, when the longitudinal movement control and the moment control linked with the lateral movement are performed from the normal region, the control effect can be obtained from the normal region. However, from a different viewpoint, there may be required a high level of the NVH (Noise, Vibration, Harshness) performance of the actuator for realizing such a control or the durability while these factors are the characteristics of the control.

For example, a case where a motor is used as the actuator for the longitudinal movement control in an electric automobile or a hybrid automobile, and a case where a control booster or an electric brake is used, the durability and the NVH performance do not pose a problem. However, when the ESC is performed from the normal region, the cost for solving these problems is increased. Therefore, in a case where a low-cost ESC is used, the operation region and the frequency are necessarily narrowed.

<Conclusion>

Hereinafter, the outline of the guideline of the ratio share of the deceleration control and the yaw moment control at the time of emergency avoidance will be described using the content described above.

(1) In the longitudinal acceleration control linked with the lateral movement, the speed reduction effect and the effect of making the turning center away from the obstacle are increased by setting the gain high with respect to a state amount (the lateral jerk) representing the characteristic of the lateral movement, and the avoidance performance is significantly improved.

(2) In the yaw moment control linked with the lateral movement, when the gain is set to be high with respect to the state amount (the lateral jerk) representing the characteristic of the lateral movement, a large brake force is applied to the rear wheel on the turning side when the control is performed in the turning promoting direction. In such a situation, the lateral force limit of the rear wheel is lowered, and the lateral slide angle becomes large, so that the stability is easily damaged. Therefore, the deceleration cannot be secured, and the avoidance performance is easily lowered.

(3) When the longitudinal acceleration control and the yaw moment control are performed and the gain is increased, a discomfort feeling is increased. Therefore, it is desirable that the ratio of the yaw moment control (the M+ control) be increased in the normal region in order to keep a balance between the control effect and the feeling (the deceleration at that time is set to make the resultant acceleration smoothly rotate similarly to the GVC).

(4) In a case where there is a problem in the durability or the NVH of the actuator, the operation frequency is necessarily reduced.

In the invention, only when the risk potential is high such that the emergency avoidance is expected, the operation ratio of the longitudinal acceleration control (GVC) linked with the lateral movement is set to be large, the operation ratio of the yaw moment control (M+) is set to be small, the speed is significantly reduced, and the component in a direction (a direction away from the obstacle) opposed to the velocity of the resultant force applied to the vehicle is maximized compared to a case where the risk potential is small or zero, so that the emergency avoidance performance is improved.

In addition, in the normal region, the operation ratio of the yaw moment control (M+) is set to be large, and the deceleration is set to be small compared to the GVC, so that the comfort feeling is improved.

Next, a method of quantitatively evaluating the risk potential will be described. Since the method is related to a hardware configuration of the vehicle, the embodiment of the invention will also be described.

As the evaluation of the risk potential, a situation where the vehicle is away from the obstacle (that is, a case where the risk is not manifested yet) and a state where the vehicle encounters the risk so as to perform the avoidance operation through emergency braking and the steering are considered.

In the former evaluation of the risk potential, external environment recognizing sensors are necessary for confirming the environments outside the vehicle (that is, a relative position, a relative speed, and a relative acceleration with respect to the obstacle on the path).

In order to evaluate the latter risk potential, an operation input or a vehicle behavior is measured using a steering angle sensor, a brake sensor, or an acceleration sensor, and a yaw rate sensor mounted in the vehicle. When a steep change is detected by these sensors, it can be roughly considered that the vehicle encounters a risk.

Furthermore, an improvement in the emergency avoidance performance will be considered. Of course, the latter case is a situation where the longitudinal movement control such as an automatic brake may be directly performed, and the former case is a situation where the avoidance operation is not performed yet and the lateral movement is not generated. Herein, the attention is demanded on that the improvement in the emergency avoidance performance means not only the assist at the time of the emergency avoidance, but also means that the ratio of the GVC is changed to be large in order to generate a large deceleration so as to prepare the situation when the handle is turned and the lateral movement is generated (like an insurance in which risk is not manifested, unless the driver or the system turns the handle).

Figure 19:
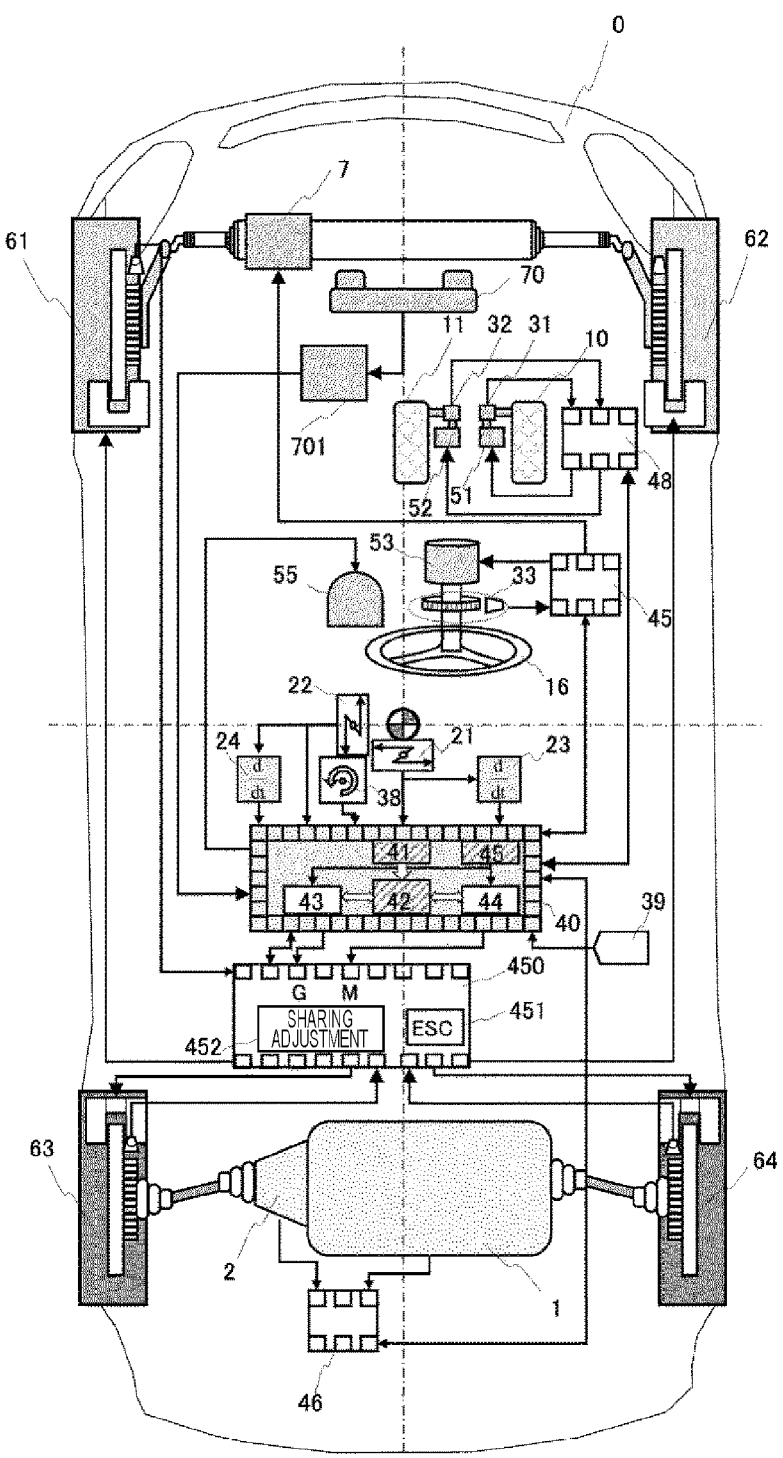
FIG. 19 is a diagram illustrating an entire configuration of a vehicle movement control system according to the invention.

FIG. 19 illustrates the entire configuration of a vehicle movement control system according to a first example of the invention as described above in which a large gain ratio of the GVC can be set with respect to the state amount (the lateral jerk, the lateral slide angle change, etc.) representing the characteristic of the lateral movement in order to confirm the risk potential not manifested and the encountered risk and to improve the emergency avoidance performance by the longitudinal movement control linked with the lateral movement.

In order to realize the most-ideal implementation, the system is configured by a so-called by-wire system, in which there is no mechanical connection between the driver, the steering mechanism, the acceleration mechanism, and the deceleration mechanism. Actually, for example, even when the system is configured such that only the steering mechanism is mechanically connected and the driver directly determines the steering angle, the invention can be applied.

In this example, the vehicle 0 is a rear engine rear drive vehicle (RR vehicle) which drives a left front wheel 61 and a right front wheel 62 using an engine 1 (the drive type is not closely related with the invention).

First, a specific configuration will be described. A brake rotor and a front wheel speed detection rotor are provided in each of the left front wheel 61, the right front wheel 62, a left rear wheel 63, and a right rear wheel 64, and a vehicle wheel speed pickup is mounted in the vehicle, so that the speed of each wheel can be detected.

A depression amount of an accelerator pedal 10 of the driver is detected by an accelerator position sensor 31, and sent to an ADAS (Advanced driver assistance system) controller 40 through a pedal controller 48 for the calculation process. Then, a power train controller 46 controls a throttle (not illustrated) of the engine 1 and a fuel injection apparatus according to the amount.

In addition, the output of the engine 1 is sent to an electronic control transmission 2 controlled by the power train controller 46, and transferred to the left rear wheel 63 and the right rear wheel 64. As the electronic control transmission, a torque converter type automatic transmission, a wet-type multiple clutch automatic transmission, a semi-automatic transmission, a continuously variable transmission (CVT), and a dual clutch transmission may be used.

The deceleration operation can be performed by switching a gear ratio from the engine to each wheel based on a speed reduction (deceleration) command output from the ADAS controller 40. For example, the deceleration operation can be generated based on a longitudinal movement command "linked with the lateral movement" such as a deceleration and a target speed command which is calculated from a road shape such as a curve or obtained by the GVC described below.

In addition, the accelerator pedal 10 is connected to an accelerator reaction force motor 51, and the pedal controller 48 performs a reaction force control based on a calculation command of the ADAS controller 40. In addition, an emergency accelerator-off is detected from a movement in a direction of closing the accelerator (particularly, a speed in a direction of closing the accelerator), and "quantification of the risk potential using the accelerator operation of the driver" is performed.

The steering system of the vehicle 0 is the front wheel steering apparatus, but there is no mechanical connection between the steering angle of the driver and a tire turning angle, and it is structured in a steer-by-wire type. The steering system includes a power steering 7 containing a steering angle sensor (not illustrated), a steering 16, a driver steering angle sensor 33, and a steering controller 45.

A steering amount of the steering 16 of the driver is detected by the driver steering angle sensor 33, sent to the ADAS controller 40 for calculation process through the steering controller 45. Then, the steering controller 45 controls the power steering 7 according to the amount.

In addition, the steering 16 is connected to a steering reaction force motor 53, and the reaction force control is performed by the steering controller 45 based on the calculation command of the ADAS controller 40. In addition, at the same time, the ADAS controller 40 detects an emergency handling from the steering operation amount of the driver (particularly, a steering angular speed), and performs "quantification of the risk potential using the steering operation of the driver".

The operation amount (the depression amount) of a brake pedal 11 of the driver is detected by a brake pedal position sensor 32, sent to the ADAS controller 40 for the calculation process through the pedal controller 48.

The brake rotor is provided in each of the left front wheel 61, the right front wheel 62, the left rear wheel 63, and the right rear wheel 64. A caliper for decelerating the wheels is mounted in the vehicle by interposing the brake rotor with pads (not illustrated).

The caliper is a hydraulic type or an electric type having an electric motor for each caliper. In the case of the hydraulic type, instead of the conventional negative pressure booster, a simple configuration is employed in which a hollow motor and a ball screw therein are used as an actuator to generate a master cylinder pressure. There may be employed an electric actuation capable of securing the brake force necessary for a natural pedal feeling in a coordination with a regeneration brake of a running motor of a hybrid electric automobile or an electric automobile. A multi-cylinder plunger pump of the ESC (Electronic Stability Control) corresponding to ITS or a gear pump may be used for the pressuring.

Basically, each caliper is controlled by a brake controller 450 based on the calculation command of the ADAS controller 40. In addition, as described above, vehicle information such as the speed of each wheel, the steering angle, the yaw rate, the longitudinal acceleration, and the lateral acceleration is input to the brake controller 450 directly or through the ADAS controller 40 so that the vehicle speed V and the vehicle lateral slide angle are calculated.

The information is always monitored in the ADAS controller 40 as common information.

In addition, the brake pedal 11 is connected to a brake pedal reaction force motor 52, and controlled by the pedal controller 48 based on the calculation command of the ADAS controller 40. In addition, at the same time, the ADAS controller 40 detects an emergency brake from the operation amount of the brake pedal of the driver (particularly, a pedal speed), and performs "qualification of the risk potential using the brake pedal of the driver".

Next, a group of movement sensors of the invention will be described.

As illustrated in FIGS. 7A and 7B, a lateral acceleration sensor 21 and a longitudinal acceleration sensor 22 are disposed in the vicinity of a gravity center point. In addition, there are mounted differential circuits 23 and 24 which differentiate the output of each acceleration sensor to obtain the jerk information. In this example, the differential circuit is illustrated to be provided in each sensor for the clarity, but the acceleration signal is directly input to the ADAS controller 40 to perform a differential process after various calculation processes.

In addition, as disclosed in Japanese Patent Application Laid-Open No. 2011-7353, the lateral jerk may be obtained based on an estimated yaw rate and a lateral acceleration using the vehicle speed, the steering angle, and a vehicle movement model. These factors may be combined by a select-high process for example. In addition, the estimation accuracy of the vehicle movement model may be improved using the signal of a yaw rate sensor 38.

Furthermore, using the movement sensor group, the state (a friction coefficient) of the road surface is estimated, a gradient of the road surface is estimated, and "quantification of the risk potential with respect to the running environment" is performed. Herein, the attention is demanded on that, in the case of a downhill road having a large gradient of the road surface, the risk potential is high and it is better to increase the lateral-movement-linked gain. However, in a case where the friction coefficient of the road surface is low, the risk potential is high, but when the lateral-movement-linked gain is increased, there is a risk to the wheel lock. Therefore, in such a case, there is a need to increase the gain is increased and to be combined with a wheel excessive slip prevention control as disclosed in Publication of Patent No. 4,920,054.

In addition, an HVI (Human Vehicle Interface) 55 is mounted in the vehicle 0 to provide assist information (system operation information) to the driver. The HVI 55 provides the system operation information to the driver using a plurality of means in association with a screen which can be seen by the driver, a warning sound, or the reaction force control of each pedal.

Furthermore, a stereo camera 70 and a stereo image processing device 701 are mounted in the vehicle 0.

The stereo camera 70 includes two CCD cameras for capturing an image on the right and left sides.

Two CCD cameras are, for example, disposed to interpose a rear-view mirror (not illustrated) in the vehicle cabin, separately capture an object in front of the vehicle from a coordinate different in the vehicle fixed system, and output two pieces of image information to the stereo image processing device 701. Herein, CMOS cameras may be used instead of the CCD cameras.

The image information is input from the stereo camera 70 to the stereo image processing device 701 and the vehicle speed V is input from the brake controller 450 through the ADAS controller 40. The stereo image processing device 701 recognizes forward information such as three-dimensional object data and white line data in front of the vehicle 0 based on the image information from the stereo camera 70, and estimates a vehicle running path based on the information.

Furthermore, the stereo image processing device 701 investigates whether there is a three-dimensional object such as an obstacle or a preceding vehicle on the running road of the subject vehicle, recognizes the closest three-dimensional object as an obstacle against the collision, and outputs the information to the ADAS controller 40. Then, the ADAS controller 40 performs "quantification of the risk potential based on the external information" based on a subject speed, a relative position, a relative speed, and a relative acceleration (these will be referred to as running environment data).

Figure 20:
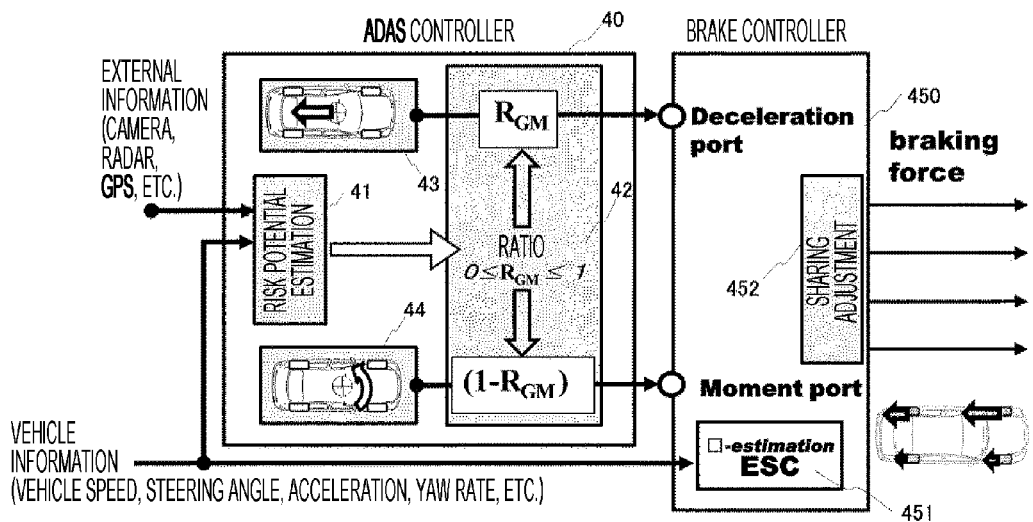
FIG. 20 is a diagram illustrating an internal configuration of an ADAS controller and a brake controller.
Figure 21:
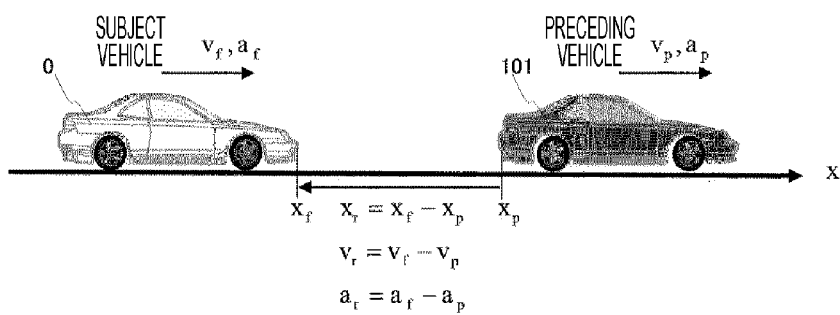
FIG. 21 is a diagram illustrating a relative relation between a subject vehicle and a preceding vehicle.

FIG. 20 illustrates the internal configuration of the ADAS controller 40 and the brake controller 450 of the invention. As basic configurations, the brake controller 450 includes ports for an ACC, a deceleration control input which enables a pre-crash brake, and the yawing moment input for a lane deviation prevention system. When a control command is input to the brake controller 450 by an appropriate method based on the input/output information of the I/O port of a CAN (Control Area Network), the deceleration and the yawing moment of the vehicle can be controlled. Of course, since the yawing moment command of the conventional ESC operation is also generated, an upper limit value is set to the command for the input port, and a logic which performs an adjustment operation (sharing the brake force of four wheels) such as temporal nullification is also combined with an ESC control unit 451.

The ADAS controller 40 includes a risk potential estimation unit 41 which receives external information from a stereo camera, a radar, and a GPS and vehicle information such as a vehicle speed, a steering angle, an acceleration, and a yaw rate, and estimates a risk level (that is, the risk potential of the vehicle is estimated based on the input environmental information and the vehicle information). In addition, an acceleration/deceleration controller 43 and a yawing moment controller 44 are provided. In this example, the acceleration/deceleration controller 43 as a vehicle longitudinal movement control unit contains a GVC logic, and obtains "the longitudinal movement linked with the lateral movement" as a command value of the acceleration/deceleration based on Expression 1, that is, generates a longitudinal movement control command of the vehicle based on a lateral jerk and a predetermined gain of the vehicle. In addition, the yawing moment controller 44 as a vehicle yawing movement control unit contains a Moment Plus logic, and obtains "the longitudinal movement linked with the lateral movement" as a command value of the yawing moment based on Expression 2, that is, generates a yawing movement control command of the vehicle based on the lateral jerk and the predetermined gain of the vehicle.

From the above, the ADAS controller 40 as the vehicle movement control system of the invention includes the risk potential estimation unit 41 which estimates the risk potential of the vehicle based on the input environmental information and the vehicle information, the acceleration/deceleration controller 43 which generates the longitudinal movement control command of the vehicle based on the lateral jerk and the predetermined gain of the vehicle, the yawing moment controller 44, and a ratio adjustment unit 42 which adjusts a ratio of the longitudinal movement control command of the vehicle generated by the acceleration/deceleration controller 43 and the yawing movement control command of the vehicle generated by the yawing moment controller 44, that is, adjusts a ratio (percentage) of the deceleration control and the moment control. The ratio adjustment unit 42 adjusts the ratio of the deceleration control and the moment control based on the risk potential estimated by the risk potential estimation unit.

In addition, the ADAS controller 40 multiplies the gain (a vehicle lateral jerk gain (a first gain) of Expression 1 in the acceleration/deceleration controller 43) Cxy of "the longitudinal movement linked with the lateral movement", and a vehicle lateral jerk gain (a second gain) Cmn of Expression 2 in the yawing moment controller 44 so as to determine each command value of the deceleration and the moment. In other words, the acceleration/deceleration controller 43 as the vehicle longitudinal movement control unit calculates a longitudinal acceleration command value of the vehicle based on the lateral jerk and the predetermined first gain (Cxy) of the vehicle and outputs the longitudinal acceleration command value. The yawing moment controller 44 as the vehicle yawing movement control unit calculates a yaw moment command value of the vehicle based on the lateral jerk and the predetermined second gain (Cmn) of the vehicle and outputs the yaw moment command value.

In addition, the ratio adjustment unit 42 adjusts the ratio of the deceleration control to be large compared to the ratio of the moment control based on the risk potential estimated by the risk potential estimation unit 41 when the risk potential is higher than the predetermined value compared to the case where the risk potential is low. In addition, in a case where the risk potential is detected by the risk potential estimation unit 41, the ratio of the longitudinal movement control command of the vehicle is adjusted to be larger than that of the yawing movement control command of the vehicle, or the longitudinal movement control command of the vehicle is adjusted to be large and the yawing movement control command of the vehicle is adjusted to be small compared to the case where the risk potential is not detected.

The ratio adjustment unit 42 calculates the ratio RGM of deceleration to yaw moment, or refers to the ratio in a map (0≤RGM≤1, 0 means only the moment control, and 1 means only the deceleration control). The gain RGM is multiplied to a deceleration command calculated by the acceleration/deceleration controller 43, and is sent to a deceleration port of the brake controller 450. In addition, at the same time, the gain (1−RGM) is multiplied to the moment command calculated by the yawing moment controller 44, and sent to a moment port of the brake controller 450. In other words, the ratio adjustment unit calculates the ratio (RGM, 0≤RGM≤1) of deceleration to yaw moment based on the risk potential estimated by the risk potential estimation unit 41, adjusts a value obtained by multiplying the ratio (RGM) to the longitudinal acceleration command value as a new longitudinal acceleration command value, and adjusts a value (1−RGM) obtained by subtracting the ratio from 1 as a new yaw moment command value.

At this time, the ratio adjustment unit 42 adjusts the ratio (RGM) of deceleration to yaw moment to be large in a case where the risk potential estimated by the risk potential estimation unit 41 is higher than the predetermined value, compared to the case where the risk potential is lower than the value, or adjusts the ratio (RGM) of deceleration to yaw moment to be zero in a case where the risk potential is not detected.

Next, a method of quantitatively evaluating the risk potential will be described.

For example, as illustrated in FIG. 9, when a preceding vehicle 101 runs in front of a subject vehicle 0 running in the x direction (where, xf is a position of the subject vehicle 0, vf is a speed, and af is an acceleration; xp is a position of the preceding vehicle 101, vp is a speed, and ap is an acceleration), the relative position is xr=xf−xp, the relative speed is vr=vf−vp, and the relative acceleration is ar=af−ap.

Using these values, the following risk potential is proposed in the related art.

(1) TTC (Time-To-Collision) (hereinafter, see Expression 19)

[Expression 19]

$$t_c = -\frac{x_r}{v_r} \quad (19)$$

TTC is an index for predicting a time until the subject vehicle comes into conflict with the preceding vehicle on an assumption that the current relative speed is maintained.

(2) KdB (approach/separation state evaluation index) (hereinafter, see Expression 20)

[Expression 20]

$$KdB = 10 \times \log\left(\frac{v_r}{x_r^3} \times \frac{-2.0}{5.0 \times 10^{-8}}\right) \quad (20)$$

KdB is an index defined based on an assumption "the driver performs the accelerating/decelerating operation while detecting approach/separation according to a change in visual area of the preceding vehicle".

(3) THW (Time-Head Way) (hereinafter, see Expression 21)

[Expression 21]

$$t_h = -\frac{x_r}{v_f} \quad (21)$$

THW is an index indicating a time taken for reaching the current preceding vehicle position at the current subject speed.

(4) 1/TTC (Reciprocal of Time-To-Collision) (hereinafter, see Expression 22)

[Expression 22]

$$t_c^{-1} = \frac{1}{t_c} = -\frac{v_r}{x_r} \quad (22)$$

The reciprocal of TTC is an index which is equivalent to a temporal variation of the increasing rate of the size of the preceding vehicle (a visual size of the preceding vehicle), or a temporal variation of the logarithm of an inter-vehicle distance.

(5) RF (Risk Feeling) (hereinafter, see Expression 23)

[Expression 23]

$$RF = \frac{a}{t_c} + \frac{b}{t_h} \quad (23)$$

RF is an index which is used to express a vehicle speed control characteristic of the driver at the time of following the preceding vehicle as a physical quantity, and defines a linear sum of the reciprocals of TTC and THW as a risk subjectively felt by the driver (a and b are weighted integers obtained in advance).

These risk potentials can be obtained not only using the stereo camera but also using a distance measuring sensor such as a millimeter wave radar or a laser radar. In this example, 1/TTC (a reciprocal of Time-To-Collision) of Expression 19 showing an increase tendency as the subject vehicle 0 approaches the preceding vehicle 101 or the obstacle (not illustrated) is used.

FIG. 22 schematically illustrates a relation between 1/TTC, a relative distance Di to the obstacle, and a collision risk potential. When a distance to the preceding vehicle 101 (in a case where the preceding vehicle is stopped, it is an obstacle) is shortened, 1/TTC is increased, and the risk potential rises (in this case, the relative speed is assumed to be constant).

For example, in a case where the distance to the obstacle is D4 away, 1/TTC is a small value of 1/tc0, and the risk potential at that time becomes RP0 showing no risk (RP0≅0).

On the other hand, when the distance is short, the collision risk is steeply increased. When the distance is shorter than D1, the risk potential becomes significantly larger. The risk potential may be quantified in a stepped manner as depicted with the solid line of FIG. 22, or may be continuously quantified as depicted with the dotted line of FIG. 22. In this way, the risk potential can be quantitatively evaluated by 1/TTC.

FIG. 23 illustrates an example in which an in-vehicle steering angle sensor outputs the risk potential quantitatively evaluated using the steering operation of the driver based on steering angular speed information. Generally, when an emergency steering is performed to avoid the collision, the steering speed becomes fast. Therefore, in a case where the steering speed is slow, it means a normal drive time. In a case where the steering speed is fast, it can be considered that the risk potential is high and the place is risky.

In a case where the steering angular speed is positive, the left steering is increased. In a case where the steering angular speed is negative, the right steering is increased.

In FIG. 23, the risk potential is bisymmetrically shown with respect to the steering angular speed, but may be asymmetrical with respect to "right-hand traffic" and "left-hand traffic". In consideration of the countersteering operation (abruptly turning to an opposite direction in the current steering direction), a two-dimensional map of the steering angle and the steering angular speed may be used as well as the steering angular speed. Furthermore, the risk potential may be quantified in a stepped manner as depicted with the solid line of FIG. 22, and may be continuously quantified as depicted with the dotted line of FIG. 22.

FIG. 24 illustrates an example in which the risk potential using the lateral movement generated by the steering operation of the driver is quantitatively evaluated based on information of a difference (D) between a standard movement of a model estimation on the steering angle and an actual movement actually measured by a sensor. As a vehicle lateral movement model, for example, there is well known a transfer function denotation disclosed in Japanese Patent Application Laid-Open No. 2010-076584. When the vehicle lateral movement model is used, a yaw response, a lateral slide angle, a lateral acceleration, or a lateral jerk can be calculated with respect to the steering angle input. The value calculated using the vehicle lateral movement model is adjusted to be matched with an actual measurement value during a period when a cornering force generated in the tire is in a linear relation with the lateral slide angle of the tire. On the other hand, in the case of the emergency avoidance, the steering angle becomes large, or the lateral acceleration becomes large, thereby broking the linearity in the lateral slide angle and the cornering force of the tire. In such a situation, there is caused a large deviation between the standard movement of the model estimation and the actual movement. As a result, it can be considered that an emergency degree is low during a period when the deviation (difference (D)) is small, and the emergency degree is increased as the deviation becomes large. Therefore, in a case where the difference (D) between the standard movement and the actual movement is small, it means a normal drive time. In a case where the difference is large, it can be considered that the risk potential is high and the place is risky. Furthermore, risk potential may be quantified in a stepped manner as depicted with the solid line of FIG. 24, or may be continuously quantified as depicted with the dotted line of FIG. 22.

In addition, while not illustrated in the drawing in this example, the risk potential is defined as "the risk potential is high when the angular speed is large" even with respect to the pedal angular speed when the accelerator is turned off, and to the pedal angular speed when the brake is depressed. Then, the risk potential may be quantitatively evaluated.

FIG. 25 is a table in which the evaluation indexes of the qualitative risk levels are associated to the quantitative risk potentials of FIGS. 22, 23, and 24. In addition, FIG. 26 is a table showing an operational situation of the system with respect to each quantitative value in a case where the risk potential in the example of the invention is quantified.

The calculations of an operation command of the system such as "automatic brake", "adjustment of the gain of the longitudinal movement linked with the lateral movement", "displaying of multi-information display" of the HVI 55, "buzzer", and "vibration such as a steer reaction force and a pedal reaction force" are collectively managed by the ADAS controller 40. Hereinafter, the risk potential and the system operation will be roughly described.

RP0 indicates a situation of "no risk" which occupies the most part in a normal drive situation (the frequency of occurrence is high).

In such a state, there is no need to perform the automatic brake control for the collision avoidance (a linear brake unlinked with the lateral movement). In addition, "the longitudinal movement linked with the lateral movement" has a low possibility to assist a steep lateral movement such as the emergency avoidance. Therefore, it is important that the deceleration amount by the control falls within a range in which the roll of the lateral movement and the pitch of the longitudinal movement cause no incompatibility of the driver.

Then, when the driver adds a straight correction steering or performs a smooth lane change (take time to move to another lane), it is important that "unsmooth feeling" is not caused by a large deceleration.

In order to relatively reduce the deceleration, the ratio of the deceleration control by the GVC is set to be small (0 to 0.25 in this example), and the ratio of the moment control of the M+ is set to be large (1.0 to 0.75), so that the incompatibility can be reduced while maintaining a merit on the movement control linked with the lateral movement.

In addition, as an extreme example, when the lateral-movement-linked gain such as Cxy and Cm is set to zero as well as the ratio at that time, the operation frequency of the deceleration actuator can be reduced at a normal time, and durability requirements can be alleviated. In addition, even when a vehicle is equipped with a chip deceleration actuator having a low NVH performance, the possibility to cause a problem in the NVH performance can be significantly reduced. With this regard, the description will be made about a second example using FIGS. 31, 32, and 33 in which the gain for determining each control command is changed as well as changing the ratio of the deceleration control and the yaw moment control based on the risk potential.

Of course, in the situation of "no risk" of RP0, the multi-information display of the HVI 55, the buzzer, and the vibration of the steer reaction force and the pedal reaction force are not controlled.

Next, RP1 is the situation of collision when the current state is maintained without acceleration or deceleration in a situation "there is a possibility of collision". Therefore, there is a need to prompt the drive to depress the brake (including the engine brake) (in this stage, the automatic brake control is not performed).

At this time, the front vehicle display and the front attention are displayed in the multi-information display, and the buzzer sounds like "beep, beep, beep . . . " to notice the driver about a possibility of collision. Furthermore, a weak vibration is given to the steer reaction force and the pedal reaction force to call attention.

At the time of RP1, the ratio RGM of deceleration to yaw moment is set to be large compared to the time of RP0 (0.2→0.4), the ratio of the deceleration control is increased, and an avoidance potential is set to be high for the steering avoidance in case of collision (even in a case where the steering is not made, there is no influence on the vehicle movement).

When the risk potential becomes RP2, the situation becomes "the possibility of collision is high". Similarly to PTL 1, an automatic brake is weakly operated (warning brake) even when the driver does not depress the brake. The automatic brake is unlinked with the lateral movement, and corresponds to Gx_DC of Expression 1. The ratio RGM of deceleration to yaw moment is set to be large compared to the time of RP1 (0.4→0.6), the ratio of the deceleration control is increased, and the avoidance potential is more increased in case of the emergency avoidance. The display and the buzzer are the same as those at the time of RP1, but the steer reaction force and the pedal reaction force are greatly vibrated compared to RP1.

Furthermore, RP3 is the situation "the possibility of collision is extremely high", and the automatic brake is strongly operated (the emergency brake). Furthermore, the ratio RGM of deceleration to yaw moment becomes large compared to RP2 (0.6→0.8 to 1.0). Therefore, when the moment is operated, the ratio of alleviating the force in the deceleration direction can be made small, the deceleration can be maximized by the four wheels, and the situation turns the vehicle to advantage for the emergency avoidance. The buzzer continuously sounds like "beep--", the steer reaction force and the pedal reaction force are greatly vibrated compared to RP2.

Figure 27:
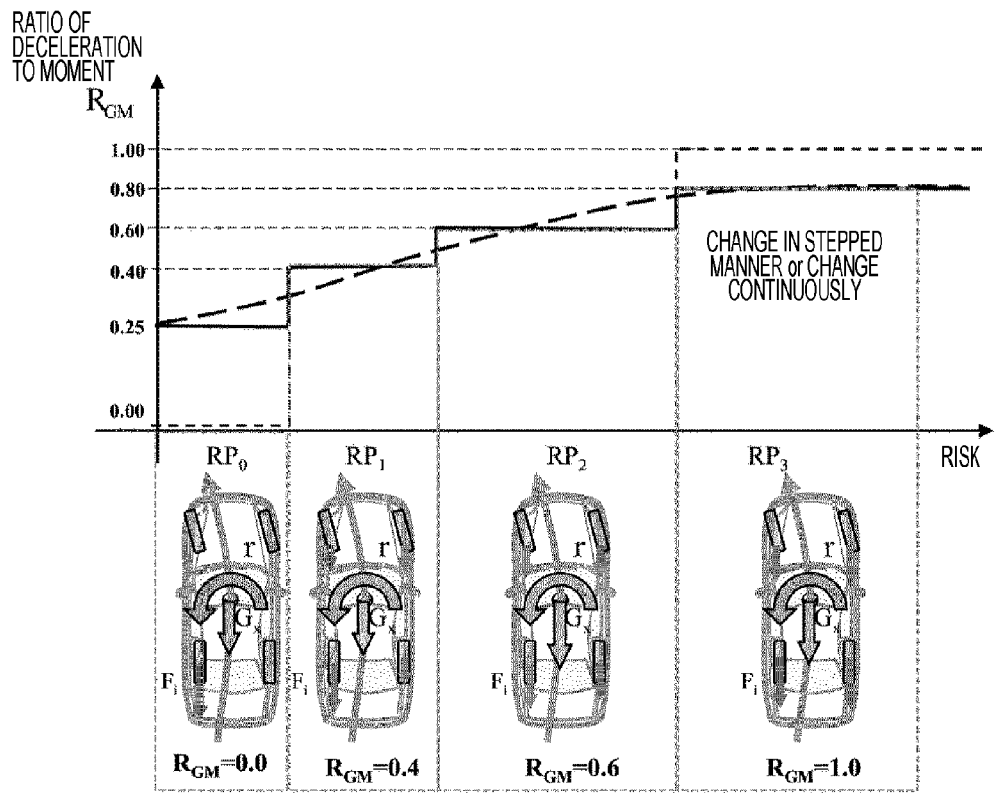
FIG. 27 is a diagram schematically illustrating an operational situation of the vehicle movement control system of the invention.

FIG. 27 is a diagram schematically illustrating these situations. When the deceleration control GVC shown in the above Expression 1 and the moment control M+ shown in Expression 2 are considered without the sign function and the primary delay as illustrated in the drawing, a deceleration command value becomes a value obtained by multiplying the lateral-movement-linked gain −Cxy to the vehicle lateral jerk, and the moment command value becomes a value obtained by multiplying the lateral-movement-linked gain Cm to the vehicle lateral jerk. Furthermore, the ratio adjustment unit 42 multiplies (1−RGM) to the moment command value, multiplies RGM to the deceleration command value, and sends the command values to the moment port and the deceleration port of the brake controller 450, respectively.

As the vehicle approaches an obstacle (an elk in FIG. 27), the ratio RGM of deceleration to yaw moment is set to be large, and the ratio of the deceleration control is adjusted to be increased so as to perform avoidance after warning, avoidance after warning brake, and avoidance after emergency brake.

In addition, the ratio RGM of deceleration to yaw moment may be changed in a stepped manner as the quantified risk potential is increased, or may be changed to be continuously increased.

As described above, by changing the ratio RGM of deceleration to yaw moment, only the moment control by the M+ is performed at the normal time of RP0, and as a result the deceleration is decreased to cause less incompatibility. At the time of RP3, only the deceleration control by the GVC is performed, so that it is possible to realize a configuration that the emergency avoidance potential is maximized. Specifically, at the normal time of RP0, the brake applied to the left rear wheel gradually comes to be applied to the front wheels or also to the right wheels in order to promote the yaw movement to the left movement for the avoidance. At the time of RP3, the brake force comes to be equally applied to the right and left wheels.

In FIG. 28, these control functions are plotted in which the vertical axis represents the deceleration command value per unit lateral movement (for example, the lateral jerk 1 m/s3) and the horizontal axis represents the risk. In a case where the risk is RPs<RPL, a relation of GmL>GmS is established (where, GmL is a deceleration command value for RPL, and GmS is a deceleration command value for RPs). In addition, when the moment command value for RPL is MmL, and a deceleration command value for RPs is MmS, a relation of MmL<MmS is established.

FIG. 29 is a conceptual diagram more clearly illustrating the configuration of the vehicle movement control system of FIG. 27.

A relative distance, a relative speed, and a relative acceleration to the obstacle are detected by an environment sensor such as a stereo camera, and the ADAS controller 40 quantifies the risk potential based on a criteria of 1/TTC using the information. In the ADAS controller 40, the ratio adjustment unit 42 which is configured by a map storing the ratio RGM of deceleration to yaw moment multiplies the RGM to the deceleration command calculated by the acceleration/deceleration controller 43, multiplies (1−RGM) to the moment command calculated by the yawing moment controller 44 according to the risk level, and sends the command values to the brake controller 450 as CAN signals. The ratio adjustment unit 42 may be configured to output the gain corresponding to the estimated risk potential using the map storing the ratio of deceleration to yaw moment according to the risk potential stored in advance.

In the example described above, the deceleration command and the moment command are transmitted only to the brake controller 450, but the ADAS controller 40 may send the deceleration command and the moment command not only to the brake controller 450 but also to a regenerative brake motor 1 or a CVT 2 so as to realize the longitudinal movement control and the moment control linked with the suitable lateral movement based on the risk potential.

In a case where the driver does not perform the avoidance operation, the deceleration command and the moment command linked with the lateral movement are not issued, but the linear brake control is performed of course based on the risk potential. As the system, the avoidance potential is increased in a case where the emergency avoidance steering is operated. However, the attention is demanded on that the operation of the longitudinal movement control linked with the lateral movement is not automatically performed but performed based on the driver's intention from the beginning (steering operation).

In addition, in a case where the driver tries to avoid the obstacle by an excessive movement operation at the time of the avoidance operation, the possibility of interference between the driver's operation and "the longitudinal movement control linked with the lateral movement" is not excluded.

For example, in the case of the rear engine rear drive vehicle, the accelerator is fully opened in accordance with the steering operation, the lateral force of the rear wheel is reduced by the drive force and the yawing movement may be steeply raised to perform the avoidance. Further, the rear wheel is locked by operating a parking brake, and the avoidance may be performed in a state of a so-called spin turn. In the case of such a situation, a predetermined threshold is set to the operation amount of the accelerator or the parking brake. Therefore, when the operation amount exceeds the threshold, the lateral-movement-linked gain of "the deceleration and the moment command linked with the lateral movement" is set to be small compared to the gain determined according to the risk potential.

Specifically, the longitudinal movement control command linked with the lateral movement becomes zero in a case where the accelerator operation command from the driver exceeds the predetermined threshold.

Figure 30:
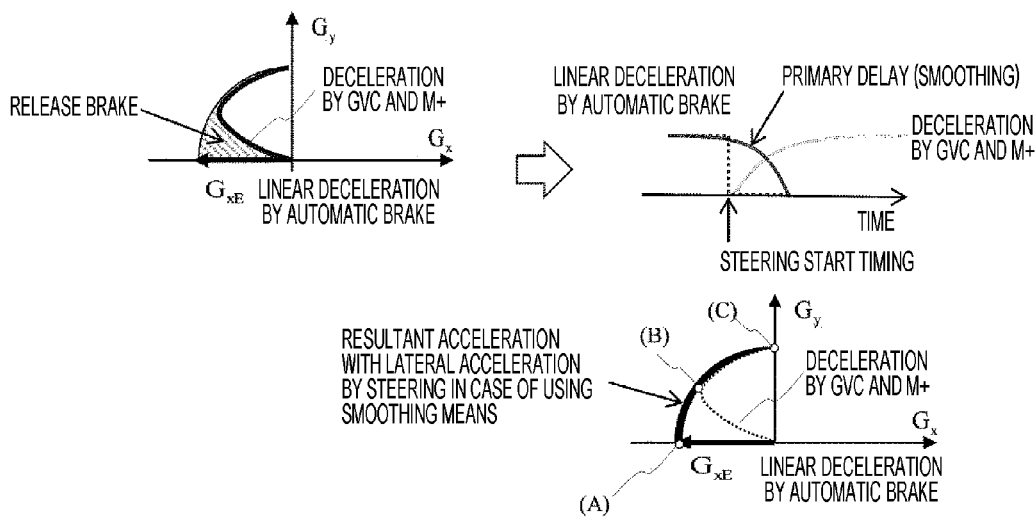
FIG. 30 is a diagram illustrating a linked situation of a linear deceleration caused by an automatic brake and a deceleration linked with the lateral movement by the G-Vectoring control and the moment plus control.

FIG. 30 is a diagram illustrating a linked situation of a linear deceleration caused by the automatic brake such as "warning brake" and "emergency brake", a deceleration control linked with the lateral movement by the GVC and the M+, and the moment control.

In particular, the diagram on the left side illustrates a "g-g" diagram illustrating a change in the resultant acceleration vector G(Gx, Gy) of the vehicle, in which the x axis represents the vehicle longitudinal acceleration and the y axis represents the vehicle lateral acceleration.

As illustrated in FIG. 27, in the invention, there is a need to consider "avoidance after warning brake" and "avoidance after emergency brake". As described above, the automatic brake control illustrated in each of FIGS. 26 and 27 with the configuration of PTL 1 corresponds to a linear deceleration when only the longitudinal movement is controlled.

Therefore, the deceleration change appears only on the x axis in the "g-g" diagram of FIG. 30 (Gx_DC of Expression 1). With this regard, regardless of the linear deceleration, a change in the resultant acceleration vector G(Gx, Gy) of the deceleration and the lateral acceleration in the GVC and the M+ at the time of the avoidance operation by the steering is illustrated by a curve in FIG. 30. The start point is the origin point, and when the avoidance is performed to the left side, the positive lateral acceleration and the deceleration in the longitudinal direction linked with the acceleration are added. Therefore, when the lateral acceleration is increased to move to another lane, the change occurs in the fourth quadrant.

On the other hand, as disclosed even in PTL 1, since there is set a time for prohibiting the brake control, in a case where the steering angle by the driver or the steering angular speed becomes large, the automatic brake control such as the warning brake or the emergency brake is released when the avoidance operation starts. Herein, the deceleration control and the moment control linked with the lateral movement are performed by the GVC and the M+, but there is a possibility that the deceleration instantaneously falls down during a period when the automatic brake control is released and the deceleration by the GVC or the M+ comes to be raised. This is called "G slipping (brake slipping)" which not only incurs a bad feeling but also becomes a cause of steep change in the driver's viewpoint due to the pitching or a cause of change in a ground load of the tire. Therefore, it is concern about that the avoidance performance is reduced by the steering.

In the invention, the ADAS controller 40 includes, for example, a smoothing means such as a primary delay filter (a low-pass filter) in order not to steeply reduce the linear deceleration command due to the automatic brake (to the step state) at a start timing of the steering, so that the decelerations by the GVC and the M+ linked with the lateral movement generated by the steering operation are smoothly linked. As illustrated in FIG. 30, the deceleration passes from the linear deceleration (Point A) to Point B, and can move to Point C of only the lateral movement.

With this configuration, it is possible to make the viewpoint of the driver stable and to reduce the change in the ground load. It becomes easy for the driver to calmly perform the avoidance operation even at the emergency time.

Next, the description will be made about the second example of the invention using FIGS. 31 and 32 in which the ratio RGM of deceleration to yaw moment is changed and the deceleration control linked with the lateral movement and the moment control linked with the lateral movement are also changed in strength (gain) according to the risk potential. As a basic configuration, similarly to FIG. 29, there is provided a gain adjustment unit which multiplies a gain K to the deceleration command value calculated by the acceleration/deceleration controller 43 and the moment command value calculated by the yawing moment controller 44 based on the risk potential and stores the gain in maps 460 and 461 for example. Similarly to the ratio RGM of deceleration to yaw moment of FIG. 27, the maps 460 and 461 store a relation such that the gain K is increased when the risk potential is increased.

In particular, when a gain KRP0 for RP0 is set to 0, an operation frequency of the brake actuator in the normal region can be set to zero.

Figure 32:
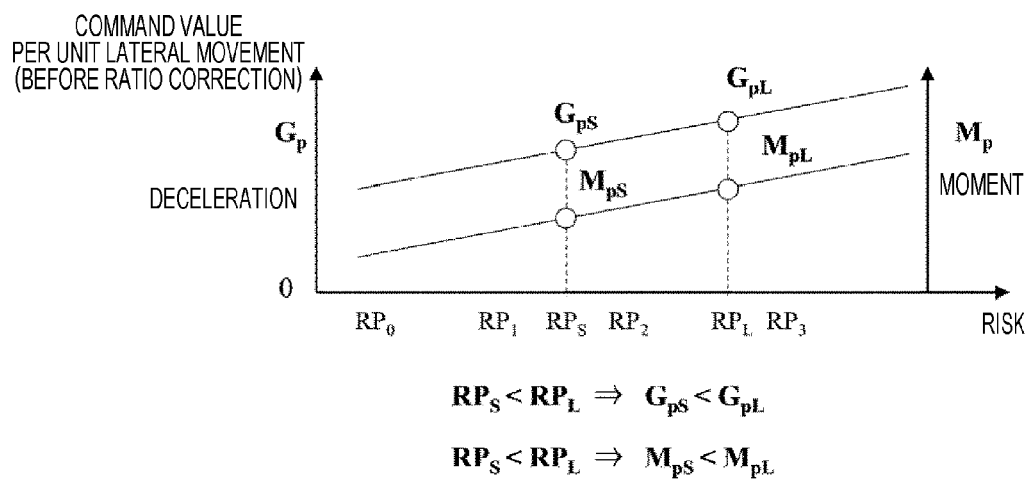
FIG. 32 is a diagram specifically illustrating an operational situation of the vehicle movement control system according to the second example of the invention based on a command value.

In FIG. 32, the deceleration command value and the moment command value (before ratio correction) per unit lateral movement (for example, the lateral jerk is 1 m/s3) are plotted using a vertical biaxial graph. In a case where RPS is less than RPL as the risk, a relation of GpL>GpS is established (where, GpL is a deceleration command value for RPL, and GpS is a deceleration command value for RPs). In addition, a relation of MpL>MpS is established (where, MpL is a moment command value for RPL, and MpS is a deceleration command value for RPs).

In the ratio adjustment unit 42, in control command values (Gp, Mp) multiplied with the gain K by brake force sharing adjustment units 452 and 453 in the gain adjustment unit, the deceleration command value Gp is multiplied with RGM, the moment command value Mp is multiplied with (1−RGM), and the respective command values are sent to the brake controller 450 as the CAN signals.

With such a configuration, in the situation of "no risk" of RP0, it is fundamentally possible to decrease the deceleration by the deceleration control and the deceleration generated as a result of the moment command, and a comfortable feeling can be increased. Further, it is possible to reduce the usage frequency of the actuator as described below. The alleviation of requirements for a speed actuator based on this configuration will be described at the end of the description.

In the speed actuator as illustrated in FIG. 29, the configuration using a so-called ESC in which the deceleration is performed using a pump-up oil may cause a problem in durability of the pump compared to the other configurations using a motor or the CVT in many cases. Furthermore, the noises generated at the time of the operation may cause a problem in many cases. With this regard, the operation from the normal region is handled by a so-called "premium specification" in which a multi-cylinder plunger pump or a gear pump is used. On the other hand, even though vehicles of a low price range are required to mount the ESC, these vehicles cannot employ the ESC because of the cost saving.

Even in such vehicles of a low price range, the emergency avoidance performance can be improved by employing the invention.

Figure 31:
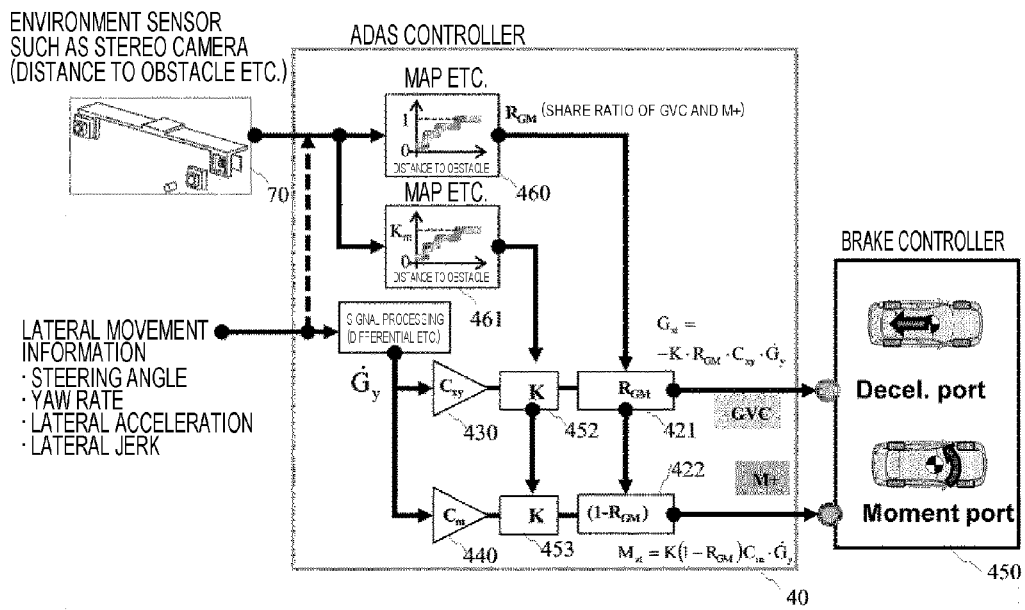
FIG. 31 is a diagram conceptually illustrating a configuration of the vehicle movement control system according to a second example of the invention.

In the gain adjustment unit of the ADAS controller 40, when the lateral-movement-linked gain in a state where the risk potential is RP0 (that is, no risk) is set to "zero" as illustrated in FIGS. 31 and 32, the deceleration command and the moment command also become zero and the speed actuator is not operated in the state of no risk even when the lateral movement is generated.

Herein, referring to the risk frequency graph in the uppermost portion of FIG. 33, it can be seen that the great part of a lifetime drive situation is the normal time (no risk). Therefore, it is possible to significantly propose the operation time greatly affecting the durability by setting the gain at the normal time to zero.

For example, when a control method of increasing the gain of the invention is employed with respect to the quantitatively evaluated risk level as the risk level is increased as follows:
  the gain 0.0 for RP0,
  the gain 1.0 for RP1,
  the gain 1.5 for RP2, and
  the gain 2.0 for RP3,
  a lifetime normalization operation time (also considering an operation strength) can be reduced to 2.3% compared to a case where the second example of the invention is not employed and the same gain (normalization gain 1.0) is used from the state "no risk" (RP0) to the state "the possibility of collision is significantly high" (RP3).

In addition, since some operation noises, vibration, and discomfort feeling are allowed at the time when the risk is high, it is possible to improve the emergency avoidance performance by the invention even in the vehicles of a low price range (because the ESC is a standard device).

Hitherto, the deceleration control and the moment control linked with the lateral movement have been described with the control effect when the ratio of the deceleration control is increased, the problem in feeling, and the problem in the actuator, and the specific method of quantifying the risk potential according to the invention, the method of adjusting the ratio RGM of deceleration to yaw moment based on the risk potential, and the effect obtained by adjusting the lateral-movement-linked gain has been described.

According to the invention, it is possible to provide the vehicle movement control system which does not cause discomfort feeling at the normal time and securely assists the driver at the time of emergency avoidance steering. In addition, it is possible to widen a possibility to employ the brake actuator having a durability and a low NVH performance, and to provide the above-described merit to the vehicles of a low cost range by setting the gain of "the normal region" having a significantly high frequency of occurrence to zero.

REFERENCE SIGNS LIST 0 vehicle
1 engine
2 electronic control transmission
7 power steering
10 accelerator pedal
11 brake pedal
16 steering
21 lateral acceleration sensor
22 longitudinal acceleration sensor
23, 24 differential circuit 31 accelerator position sensor
32 brake pedal position sensor
33 driver steering angle sensor
38 yaw rate sensor
40 ADAS controller
41 risk potential estimation unit
42 unit of adjusting ratio of deceleration to yaw moment
43 acceleration/deceleration controller
44 yawing moment controller
450 brake controller
451 ESC control unit
452 brake force sharing adjustment unit
45 steering controller
46 power train controller
48 pedal controller
51 accelerator reaction force motor
52 brake pedal reaction force motor
53 steering reaction force motor
61 left front wheel
62 right front wheel
63 left rear wheel
64 right rear wheel
70 stereo camera
701 stereo image processing device

The invention claimed is:

1. A vehicle movement control system, comprising:
a risk potential estimation unit which estimates a risk potential of a vehicle based on input environmental information and vehicle information;
a vehicle longitudinal movement control unit which generates a longitudinal movement control command of the vehicle based on a lateral jerk of the vehicle and a predetermined gain;
a vehicle yawing movement control unit which generates a yawing movement control command of the vehicle based on the lateral jerk of the vehicle and the predetermined gain; and
a ratio adjustment unit which adjusts a ratio between the longitudinal movement control command of the vehicle and the yawing movement control command of the vehicle,
wherein the ratio adjustment unit adjusts the ratio based on the risk potential estimated by the risk potential estimation unit.

2. The vehicle movement control system according to claim 1,
wherein, in a case where the risk potential is detected by the risk potential estimation unit, the ratio adjustment unit adjusts the ratio of the longitudinal movement control command to be larger than the ratio of the yawing movement control command compared to a case where the risk potential is not detected.

3. The vehicle movement control system according to claim 1,
wherein, in a case where the risk potential is detected by the risk potential estimation unit, the ratio adjustment unit adjusts the longitudinal movement control command to be large and the yawing movement control command to be small compared to a case where the risk potential is not detected.

4. The vehicle movement control system according to claim 1,
wherein the vehicle longitudinal movement control unit calculates a longitudinal acceleration command value of the vehicle based on the lateral jerk of the vehicle and a predetermined first gain, and outputs the longitudinal acceleration command value,
wherein the vehicle yawing movement control unit calculates a yaw moment command value of the vehicle based on the lateral jerk of the vehicle and a predetermined second gain, and
wherein the ratio adjustment unit adjusts a ratio of deceleration to yaw moment based on the risk potential estimated by the risk potential estimation unit.

5. The vehicle movement control system according to claim 4,
wherein the ratio adjustment unit calculates the ratio of deceleration to yaw moment based on the risk potential estimated by the risk potential estimation unit, adjusts a value obtained by multiplying the ratio to the longitudinal acceleration command value as a new longitudinal acceleration command value, and adjusts a value obtained by multiplying the ratio subjected from 1 to the yaw moment command value as a yaw moment command value.

6. The vehicle movement control system according to claim 5,
wherein, in a case where the risk potential estimated by the risk potential estimation unit is higher than a predetermined value, the ratio adjustment unit adjusts the ratio (RGM) of deceleration to yaw moment to be large compared to a case where the risk potential is lower than the value.

7. The vehicle movement control system according to claim 2,
wherein, in a case where the risk potential is not detected, the ratio adjustment unit adjusts the ratio of deceleration to yaw moment to be zero.

8. The vehicle movement control system according to claim 4,
wherein, in a case where the risk potential estimated by the risk potential estimation unit is higher than a predetermined value, the ratio adjustment unit adjusts the first gain or/and the second gain to be large compared to a case where the risk potential is lower than the value.

9. The vehicle movement control system according to claim 8,
wherein, in a case where the risk potential estimated by the risk potential estimation unit is zero, the ratio adjustment unit adjusts the first gain or/and the second gain to be zero.

10. The vehicle movement control system according to claim 1,
wherein the environmental information is environmental information of a front side of a subject vehicle obtained from a camera or a radar, and
wherein the vehicle information is at least one of a vehicle speed, a steering angle, an acceleration, a yaw rate, a pedal operation speed, and a brake operation speed.

11. The vehicle movement control system according to claim 1,
wherein the risk potential estimation unit estimates a quantitatively evaluated value of the risk potential of the vehicle.

12. The vehicle movement control system according to claim 1,
wherein the risk potential of the vehicle is quantitatively evaluated based on time-to-collision, a steering angular speed, a difference between a lateral movement of the vehicle of which the model is estimated and a measured actual movement.

13. The vehicle movement control system according to claim 1, wherein the ratio adjustment unit outputs the ratio of deceleration to yaw moment corresponding to the estimated risk potential using a map storing the ratio of deceleration to yaw moment according to the risk potential stored in advance.

14. The vehicle movement control system according to claim 8, wherein the ratio adjustment unit outputs the gain corresponding to the estimated risk potential using a map storing the value of the gain according to the risk potential stored in advance.

15. The vehicle movement control system according to claim 1, wherein the vehicle longitudinal movement control unit generates the longitudinal movement control command of the vehicle such that the vehicle is decelerated at the time when an absolute value of a lateral acceleration of the vehicle is increased, and the vehicle is accelerated at the time when the absolute value of the lateral acceleration of the vehicle is decreased.

16. The vehicle movement control system according to claim 1, wherein the vehicle longitudinal movement control unit generates the longitudinal movement control command of the vehicle such that the vehicle is decelerated at the time when an absolute value of a steering angle of the vehicle is increased, and the vehicle is accelerated at the time when the absolute value of the steering angle of the vehicle is decreased.

17. The vehicle movement control system according to claim 4, wherein the longitudinal acceleration command value Gxc is generated as follows:

$$G_{xo} = -sgn(G_y \cdot \dot{G}_y)\frac{C_{xy}}{1+Ts}|\dot{G}_y| + G_{x\_DC}$$

where, Gy: vehicle lateral acceleration, Gy_dot: vehicle lateral jerk, Cxy: lateral jerk gain, T: primary delay time constant, s: Laplacian operator, and Gx_DC: offset.

18. The vehicle movement control system according to claim 4, wherein the yaw moment command value is generated such that a turning of the vehicle is prompted when an absolute value of a lateral acceleration of the vehicle is increased, and the turning of the vehicle is recovered when the absolute value of the lateral acceleration of the vehicle is decreased.

19. The vehicle movement control system according to claim 3, wherein the yaw moment command value is generated such that a turning of the vehicle is prompted when an absolute value of a steering angle of the vehicle is increased, and the turning of the vehicle is recovered when the absolute value of the steering angle of the vehicle is decreased.

20. The vehicle movement control system according to claim 3, wherein the yaw moment command value Mz+ is generated as follows:

$$M_{s+} = sgn(G_y \cdot \dot{G}_y)\frac{C_{mnl}}{1+T_{num}s}|\dot{G}_y|$$

where, Gy: vehicle lateral acceleration, Gy_dot: vehicle lateral jerk, Cmnl: lateral jerk gain, Tmn: primary delay time constant, and s: Laplacian operator.

* * * * *